US005844650A

United States Patent [19]
Saito et al.

[11] Patent Number: 5,844,650

[45] Date of Patent: Dec. 1, 1998

[54] RUBBING TREATING APPARATUS AND RUBBING TREATING METHOD INCLUDING SUCTION PASSAGES TO HOLD MASKING SHEETS IN PLACE

[75] Inventors: Masamichi Saito, Inagi; Katsuyoshi Kohno, Yokohama; Bunryo Sato, Hachiohji; Yasuto Kodera, Fujisawa; Kazuhiro Aoyama, Atsugi, all of Japan

[73] Assignee: Canon Kabushiki Kaisha, Tokyo, Japan

[21] Appl. No.: 538,568

[22] Filed: Oct. 3, 1995

[30] Foreign Application Priority Data

| | | | |
|---|---|---|---|
| Oct. 6, 1994 | [JP] | Japan | 6-270250 |
| Jun. 29, 1995 | [JP] | Japan | 7-164298 |

[51] Int. Cl.$^6$ .......... G02F 1/1337

[52] U.S. Cl. .......... 349/126

[58] Field of Search .......... 349/126

[56] References Cited

U.S. PATENT DOCUMENTS

| | | | |
|---|---|---|---|
| 5,315,421 | 5/1994 | Kurai et al. | 349/126 |
| 5,353,141 | 10/1994 | Onuma et al. | 359/76 |
| 5,381,256 | 1/1995 | Hanyu et al. | 359/75 |
| 5,406,397 | 4/1995 | Kodera et al. | 359/76 |
| 5,422,750 | 6/1995 | Kodera et al. | 359/76 |
| 5,455,695 | 10/1995 | Kodera et al. | 359/76 |

FOREIGN PATENT DOCUMENTS

| | | |
|---|---|---|
| 53-136855 | 11/1978 | Japan . |
| 54-040652 | 3/1979 | Japan . |
| 62-065015 | 3/1987 | Japan . |
| 4-112536 | 4/1992 | Japan . |

*Primary Examiner*—Anita Pellman Gross
*Attorney, Agent, or Firm*—Fitzpatrick, Cella, Harper & Scinto

[57] ABSTRACT

A rubbing treating apparatus, comprising: a stage for mounting thereon an electrode substrate provided with an alignment control film, a rubbing cloth for effecting rubbing treatment by rubbing it against the alignment control film, a rubbing mask mounted on the stage so as to cover at least a part of the electrode substrate, and a holding means for causing at least the rubbing mask to closely contact the stage, wherein the rubbing mask is caused to closely contact the stage at the time of rubbing treatment. The rubbing mask is effective in imparting an alignment control power to the surface of the alignment control film, effecting uniform rubbing treatment with respect to a desired region and preventing an occurrence of alignment defects and a deterioration of the rubbing cloth.

23 Claims, 12 Drawing Sheets

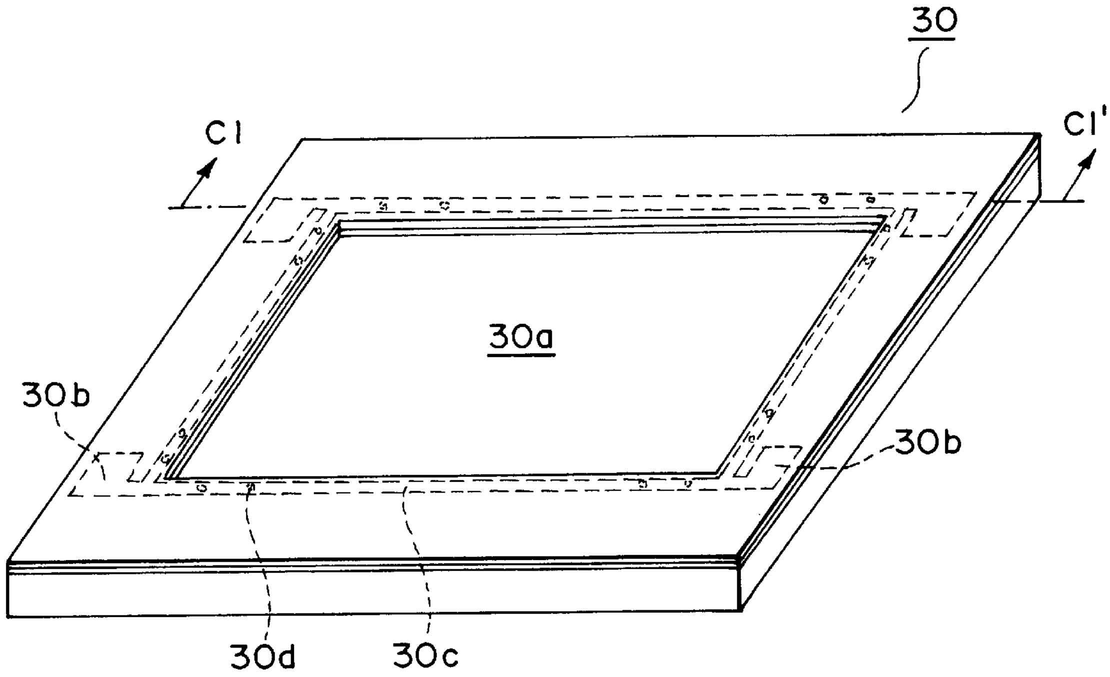
F I G. 3A
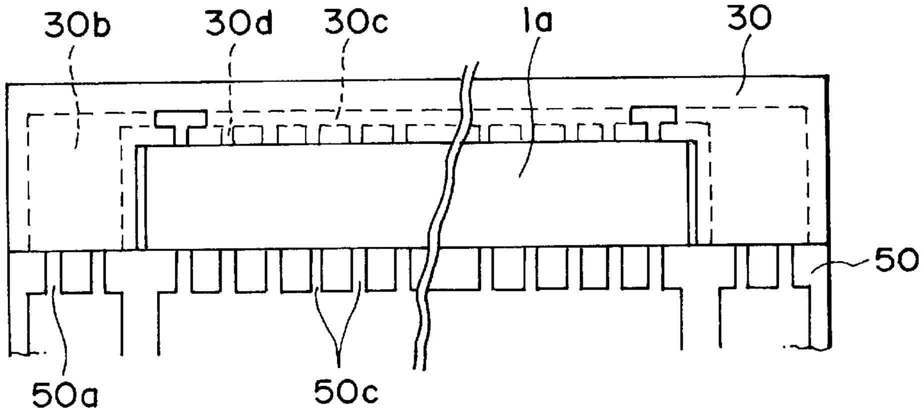
F I G. 3B

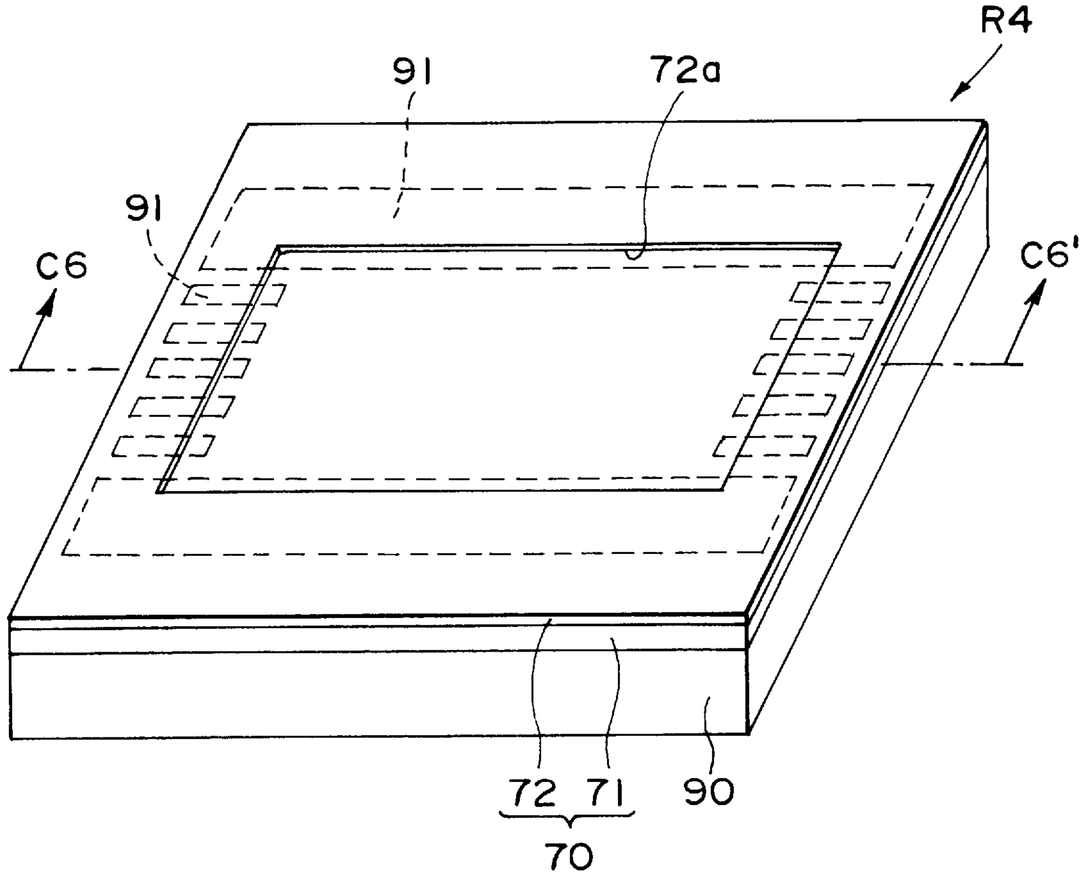
F I G. 14A
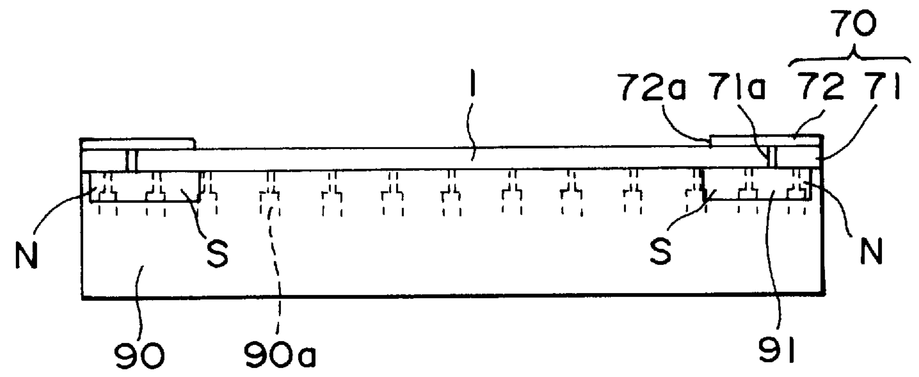
F I G. 14B

RUBBING TREATING APPARATUS AND RUBBING TREATING METHOD INCLUDING SUCTION PASSAGES TO HOLD MASKING SHEETS IN PLACE

FILE OF THE INVENTION AND RELATED ART

The present invention generally relates to a rubbing-treating apparatus and rubbing-treating method for effecting rubbing-treatment of a film (e.g., an alignment control film) formed on the surface of a substrate for use in a liquid crystal panel etc. More specifically, the present invention relates to a rubbing treating apparatus and rubbing treating method wherein rubbing-treatment is partially performed with respect to only a prescribed region on the (alignment control) film.

Hitherto, there have been proposed various liquid crystal display devices controlling an alignment state of liquid crystal molecule to effect optical modulation, particularly utilizing a property of a liquid crystal to display information.

FIG. 1 illustrates a sectional structure of an example of such a liquid crystal display device.

Referring to FIG. 1, a liquid crystal display device P includes a pair of electrode substrates 1*a* and 1*b* disposed opposite to each other and applied to each other through spacers 2 by an adhesive sealing the periphery thereof so as to provide a prescribed gap between the electrode substrates 1*a* and 1*b*. The gap between the electrode substrates 1*a* and 1*b* is filled with a liquid crystal 5. The electrode substrates 1*a* and 1*b* comprise glass substrates 6*a* and 6*b* provided with electrode groups 7*a* and 7*b* each comprising a plurality of stripe-patterned transparent electrodes, respectively. These electrode groups 7*a* and 7*b* are respectively covered with insulating films 9*a* and 9*b*, as desired, in a single layer or laminated plural layers, for preventing short circuit. On the insulating films 9*a* and 9*b*, alignment control films 10*a* and 10*b* comprising an organic insulating material (e.g., polyimide) or an inorganic insulating material are disposed, respectively, in order to control an alignment state of liquid crystal molecules. Outside the glass substrates 6*a* and 6*b*, polarizers 11*a* and 11*b* are disposed, respectively.

Hereinbelow, the pair of electrode substrates 1*a* and 1*b* are simply referred to as "electrode substrate 1" unless the electrode substrate 1*a* and the electrode substrate 1*b* are particularly distinguished from each other. Similarly, the glass substrates 6*a* and 6*b* are simply referred to as "glass substrate 6", the electrode groups 7*a* and 7*b* are simply referred to as "electrode group 7", and the alignment control films 10*a* and 10*b* are simply referred to as "alignment control film 10".

The surface of the above-mentioned alignment control films 10*a* and/or 10*b* is subjected to rubbing-treatment, thus imparting an alignment control power with respect to liquid crystal molecules to the alignment control films 10*a* and 10*b*. One of alignment-treating methods for imparting such an alignment control power may include a rubbing-treating method (hereinafter, referred to as "rubbing method") using a rubbing-treating apparatus (hereinafter, referred to as "rubbing apparatus").

FIG. 2 shows a rubbing apparatus R1 used in a rubbing method.

Referring to FIG. 2, the rubbing apparatus R1 includes a cylindrical rubbing roller 20 and a rubbing cloth 21 which is planted with pile yarn and is wound about the peripheral surface of the rubbing roller 20. The rubbing roller 20 is rotated in a direction of an arrow A by a motor (not shown).

Below the roller 20, a substrate stage 22 for mounting an electrode substrate 1 thereon is disposed and is moved in a direction of an arrow B by driving means (not shown). Either one or both of the rubbing roller 20 and the substrate stage 22 are designed so as to be capable of adjusting a level of a rubbing surface, thus modifying a pressing depth (amount of pressing) of the rubbing cloth 21.

The rubbing is performed by causing the rubbing roller 20 to abut against the alignment control film 10 with a prescribed pressing depth while the rubbing roller 20 is rotated in a direction of an arrow A and the substrate stage 22 is moved in a direction of an arrow B at a constant speed. As a result, the surface of the alignment control film 10 is rubbed in one direction by the rubbing cloth 21, thus effecting a uniform rubbing-treatment (i.e., uniaxially aligning treatment) over the entire surface of the alignment control film 10.

Incidentally, an alignment control film 10 is not necessarily formed on the entire surface of a glass substrate 6, so that the alignment control film 10 is not formed at an end section at the glass substrate 6 in some cases thereby to partially expose an electrode group 7 formed on the glass substrate 6 at the end section. Accordingly, when the exposed section of the glass substrate 6 (at which the electrode group 7 is partially exposed) is rubbed by a rubbing cloth 21, the rubbing cloth 21 is liable to be abraded.

Further, there is a case where an alignment control power is not imparted to the entire surface of an alignment control film 10 in order to control an alignment characteristic of liquid crystal molecules. In this instance, a method wherein a vertical alignment material or different alignment control films are used at a portion not imparting an alignment control power may be adopted. In such a case, however, the above method encounters a problem such that a film-forming process is complicated. Particularly, in the case of using the vertical alignment material, there arises a problem such that the vertical alignment material adversely affects or contaminates a principal alignment control film to be subjected to rubbing-treatment.

In order to remedy such a problem, there has been practiced a method of limiting a rubbing-treating region by using a mask composed of metal or plastic (hereinafter, referred to as "rubbing mask") for covering the electrode substrate surface or the alignment control film surface, as disclosed in Japanese Laid-Open Patent Application (JP-A) No. 53-136855, 54-40652 and 62-65015.

In the case of using a rubbing mask, however, various problems have arisen.

More specifically, an electrode substrate 1 is required to be moved in a prescribed direction at the time of rubbing treatment. However, due to a relative movement between a rubbing mask and the electrode substrate 1, the rubbing mask is liable to be deviated from a prescribed position or be peeled off, thus failing to impart an alignment control power to a prescribed region of an alignment control film.

Further, dust (and/or contaminant) generally generated during rubbing treatment and attached to the surface of an electrode substrate can be removed by air blowing. However, the dust is liable to enter a gap between a rubbing mask and an electrode substrate covered with the rubbing mask. In this instance, the dust is pressed against the surface of an alignment control film by a rubbing roller to be attached onto the alignment control film surface, thus failing to be removed by the above-described air blowing. As a result, when a liquid crystal display device is prepared by using such an electrode plate, a uniform alignment characteristic is not attained and the resultant liquid crystal display device encounters a problem of a lowering in display quality due to alignment defects or a change in cell thickness partially caused therein. Particularly, such alignment defects etc. are noticeable in the case of a device with a cell gap (a distance between a pair of substrate) of at most 2 μm, using a ferroelectric liquid crystal etc.

The gap between the rubbing mask and the electrode substrate described above is caused by various factors. For instance, a thickness of the electrode substrate or a thickness of the rubbing mask fluctuates between at most 50 μm above the average thickness and at most 50 μm below the average thickness (i.e., a variation of ±50 μm) due to production error or irregularity. As a result, a maximum of the gap amounts to 100 μm.

In recent years, it has been required to produce a large-area liquid crystal display device. There has been also adopted a method of obtaining a plurality of substrates in view of an improvement in productivity by effecting rubbing treatment to plural regions of one substrate and then cutting the substrate. In these cases, however, it is required to increase a rubbing-treating area, thus resulting in a large opening area of a rubbing mask used.

In the case of the large opening area, the rubbing mask is decreased in its stiffness and fails to keep its evenness, thus being separated or parted from an alignment control film without being caused to closely contact the alignment control film. As a result, there arise problems including an occurrence of alignment defects, an abrasion of a rubbing cloth and a peeling-off of the rubbing mask.

In order to solve the above problems, it is assumed that a thicker rubbing mask can ensure its stiffness. In such a case, however, the resultant rubbing mask causes a difference in height or depth between the level of the rubbing mask and that of the alignment control film, so that rubbing irregularity is liable to be caused depending on rubbing conditions or materials for the alignment control film, thus resulting in alignment defects.

SUMMARY OF THE INVENTION

In view of the above-mentioned circumstances, an object of the present invention is to provide a rubbing apparatus and rubbing method capable of stably imparting a desired property, such as an alignment control power with respect to liquid crystal molecules to the surface of an electrode substrate, particularly the surface of an alignment control film, of a liquid crystal display device, etc.

Another object of the present invention is to provide a rubbing apparatus and rubbing method capable of effecting uniform rubbing treatment to a prescribed region of an alignment control film while preventing deviation or peeling off of a rubbing mask in the case of rubbing treatment using the rubbing mask in order to impart an alignment control power to the prescribed region of the alignment control film on an electrode substrate.

Further object of the present invention is to provide a rubbing apparatus and rubbing method capable of improving a closely contacting property between a rubbing mask and an electrode substrate while preventing an occurrence of a difference in height or a gap therebetween, attachment of a contaminant onto an alignment control film leading to alignment defects, and deterioration of a rubbing cloth in the case of rubbing treatment using the rubbing mask in order to provide an alignment control power with a prescribed region of alignment control film on an electrode substrate.

According to the present invention, there is provided a rubbing treating apparatus, comprising: a stage for mounting thereon an electrode substrate provided with an alignment control film, a rubbing cloth for effecting rubbing treatment by rubbing it against the alignment control film, a rubbing mask mounted on the stage so as to cover at least a part of the electrode substrate, and a holding means for causing at least the rubbing mask to closely contact the stage, wherein the rubbing mask is caused to closely contact the stage at the time of rubbing treatment.

In the above rubbing apparatus, the stage may preferably be provided with at least one suction passage as the holding means directed to the rubbing mask at a position where the stage abuts on the rubbing mask, and the rubbing mask is caused to closely contact and held on the stage by suction through the suction passage at the time of rubbing treatment.

In the above rubbing apparatus, the rubbing mask may preferably be provided with at least one suction passage directed to the electrode substrate at a position where the rubbing mask abuts on the electrode substrate, and the rubbing mask is caused to closely contact the electrode substrate by sucking air between the rubbing mask and the electrode substrate through the suction passage at the time of rubbing treatment.

In this instance, the rubbing mask may preferably comprise a laminated structure in which plural frame-shaped members are respectively provided with a through-hole and/or a groove portion, the respective through-holes and/or the respective groove portions communicating with each other.

In the above rubbing apparatus the suction passage of the rubbing mask may preferably open into the surface of the alignment control film.

In the above rubbing apparatus the stage may preferably be provided with at least one suction passage directed to the rubbing mask at a position where the stage abuts on the rubbing mask;

the rubbing mask may preferably be provided with at least one suction passage directed to the electrode substrate at a position where the rubbing mask abuts on the electrode substrate;

the suction passage of the stage may preferably communicate with the suction passage of the rubbing mask; and the rubbing mask may preferably be caused to closely contact and held on the stage by suction through the suction passage while being caused to closely contact the electrode substrate by sucking air between the rubbing mask and the electrode substrate through the suction passages of the stage and rubbing mask at the time of rubbing treatment.

In a preferred embodiment, the stage in the above rubbing apparatus may preferably be provided with at least one suction passage directed to the electrode substrate abutting the stage, and the electrode substrate is caused to closely contact and held on the stage by suction through the suction passage at the time of rubbing treatment.

In a preferred embodiment of the above rubbing apparatus, the stage may preferably be provided with at least one suction passage leading to a gap between the side of the electrode substrate and the rubbing mask, and the electrode substrate is caused to closely contact and held on the stage by suction through the suction passage at the time of rubbing treatment.

In another preferred embodiment of the above rubbing apparatus, the rubbing mask may preferably have a (picture) frame shape. In this instance, the rubbing mask may preferably comprise plural frame-shaped members constituting a laminated structure.

In a further preferred embodiment of the above rubbing apparatus, the rubbing mask may preferably have plural opening parts allowing rubbing treatment of plural regions at the same time.

In a still further preferred embodiment of the above rubbing apparatus, the rubbing mask may preferably comprise a flexible material and is caused to closely contact and held on the electrode substrate due to its flexure.

According to the present invention, there is also provided a rubbing treating apparatus (another rubbing apparatus), comprising: a stage for mounting thereon an electrode substrate provided with an alignment control film, a rubbing cloth for effecting rubbing treatment by rubbing it against the alignment control film, a rubbing mask mounted on the stage so as to cover at least a part of the electrode substrate, and a close-contact means for causing at least the rubbing mask to closely contact the electrode substrate, wherein the rubbing mask is caused to closely contact the electrode substrate at the time of rubbing treatment.

In the above another rubbing apparatus, the rubbing mask may preferably be provided with, as the close-contact means, at least one suction passage directed to the electrode substrate at a position where the rubbing mask abuts on the electrode substrate in combination with suction means connected with the suction passage, and the rubbing mask is caused to closely contact the electrode substrate by sucking air between the rubbing mask and the electrode substrate through the suction passage at the time of rubbing treatment. The rubbing mask may preferably have a thickness of at least 0.175 mm at a portion thereof provided with the suction passage. In this instance, the suction passage of the rubbing mask may also preferably open into the surface of the alignment control film. Alternatively, the stage may preferably be provided with at least one suction passage directed to the rubbing mask at a position where the stage abuts on the rubbing mask;

the suction passage of the stage may preferably communicate with the suction passage of the rubbing mask; and the rubbing mask may preferably be caused to closely contact and held on the stage by suction through the suction passage while being caused to closely contact the electrode substrate by sucking air between the rubbing mask and the electrode substrate through the suction passages of the stage and rubbing mask at the time of rubbing treatment.

In the above another rubbing apparatus, the stage may preferably be provided with at least one suction passage directed to the electrode substrate abutting on the stage, and the electrode substrate is caused to closely contact and held on the stage by suction through the suction passage at the time of rubbing treatment.

In the above another rubbing apparatus, the stage may preferably be provided with at least one suction passage leading to a gap between the side of the electrode substrate and the rubbing mask, and the electrode substrate is caused to closely contact and held on the stage by suction through the suction passage at the time of rubbing treatment.

In a preferred embodiment of the above another rubbing apparatus, the rubbing mask may preferably have at least one opening part and an end section which has a thickness of at most 0.25 mm and contacts the opening part.

In another preferred embodiment of the above another rubbing apparatus, the rubbing mask may preferably be provided with plural opening parts and a strip portion defining the plural opening parts, and the strip portion may preferably be provided with the close-contact means by which the strip portion is caused to closely contact the electrode substrate at the time of rubbing treatment. In this instance, the strip portion may preferably be supplied with a residual tensile stress so as to enhance a stiffness thereof. Alternatively, the rubbing mask may preferably be comprise a first part abutting on the stage, a second part connected with the first part and extending toward above a peripheral portion of a region in which the electrode substrate is mounted, and a third part connected with the second part and disposed so as to abut on the surface of the alignment control film at a peripheral portion of the electrode substrate when the electrode substrate is mounted. In this case, the first part may preferably be provided with a through-hole and the second part is provided with a passage or a groove portion; the through-hole and the passage or groove portion constitute a suction passage; and the rubbing mask is caused to closely contact the electrode substrate by sucking air between the rubbing mask and the electrode substrate through the suction passage at the time of rubbing treatment. In this instance, the stage may preferably be provided with at least one suction passage directed to the suction passage of the rubbing mask at a position where the stage abuts on the rubbing mask, and the rubbing mask is caused to closely contact the stage and the electrode substrate through the suction passages of the stage and the rubbing mask at the time of rubbing treatment.

In a further preferred embodiment of the above rubbing apparatus, the close-contact means may preferably comprise a magnet disposed within the stage and the rubbing mask comprises at least a part composed of a paramagnetic material.

According to the present invention, there is further provided a rubbing treating method, comprising:

covering at least a part of an alignment control film, provided to an electrode substrate mounted on a stage, with a prescribed-shaped rubbing mask, and selectively rubbing the alignment control film, wherein the rubbing mask is caused to closely contact and held on the stage by suction during rubbing treatment. In this instance, the above-mentioned two types of the rubbing apparatus may preferably be used.

According to the present invention, there is still further provided a rubbing treating method, comprising:

covering at least a part of an alignment control film, provided to an electrode substrate mounted on a stage, with a prescribed-shaped rubbing mask, and selectively rubbing the alignment control film, wherein the rubbing mask is caused to closely contact the electrode substrate by sucking air between the rubbing mask and the electrode substrate during rubbing treatment. In this case, the above-described two types of the rubbing apparatus may preferably be employed.

By using the above-mentioned rubbing apparatus and/or rubbing method, uniform rubbing treatment is stably performed with respect to only a desired or prescribed region of an alignment control film provided to an electrode substrate without causing attachment of dust or a contaminant and alignment defects, thus imparting a good characteristic, such as an excellent alignment control power, to the surface of the alignment control film. This is because a rubbing mask is mounted on a stage so as to cover at least a part of an electrode substrate, and the rubbing mask is caused to closely contact the stage and/or the electrode substrate by a holding (or close-contact) means. In this state, when the rubbing apparatus is driven, a rubbing cloth rubs a prescribed surface of an alignment control film and does not contact the covered portion of the electrode substrate. Further, the rubbing mask is effective in retaining a good close-contact state while preventing a gap formation and a deviation from the electrode substrate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A and 3B are views for illustrating a first embodiment according to the present invention, wherein FIG. 3A is a perspective view for illustrating a shape of a rubbing mask and FIG. 3B is a C1–C1' sectional view for illustrating a structure of the rubbing mask and a stage.

FIGS. 9A–9C are views for illustrating a structure of a rubbing mask and a stage used in a fourth embodiment of the invention, wherein FIG. 9A is a perspective view, FIG. 9B is a C2–C2' sectional view of FIG. 9A, and FIG. 9C is a partially enlarged view of D1 portion of FIG. 9B.

FIGS. 10A–10C and FIGS. 11A–11C are respectively views for illustrating a modified example of a fourth embodiment of the invention, wherein FIGS. 10A and 11A are respectively a perspective view, FIGS. 10B and 11B are a C3–C3' sectional view and a C4–C4' sectional view, respectively, and FIGS. 10C and 11C are partially enlarged view of D2 portion and D3 portion, respectively.

FIGS. 12A–12C are views for illustrating a structure of a rubbing mask and a stage used in a fifth embodiment of the invention, wherein FIG. 12A is a perspective view, FIG. 12B is a C5–C5' sectional view of FIG. 12A, and FIG. 12C is a partially enlarged view of D4 portion of FIG. 12B.

FIGS. 14A–14B are views for illustrating a structure of a rubbing mask and a stage used in a sixth embodiment of the invention, wherein FIG. 14A is a perspective view and FIG. 14B is a C5–C5' sectional view of FIG. 14A.

DETAILED DESCRIPTION OF THE PREFERRED EMBODIMENTS

Figure 1:
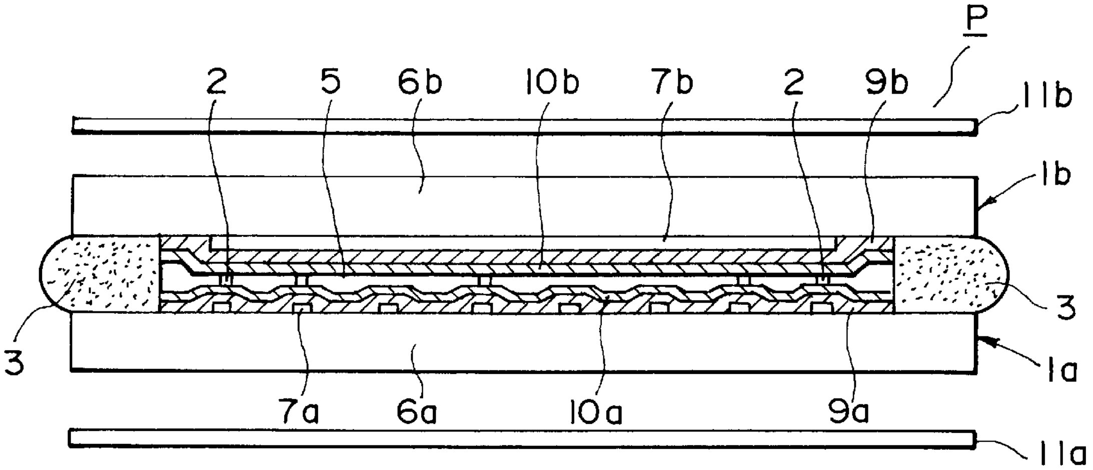
FIG. 1 is a sectional view of a liquid crystal display device.
Figure 2:
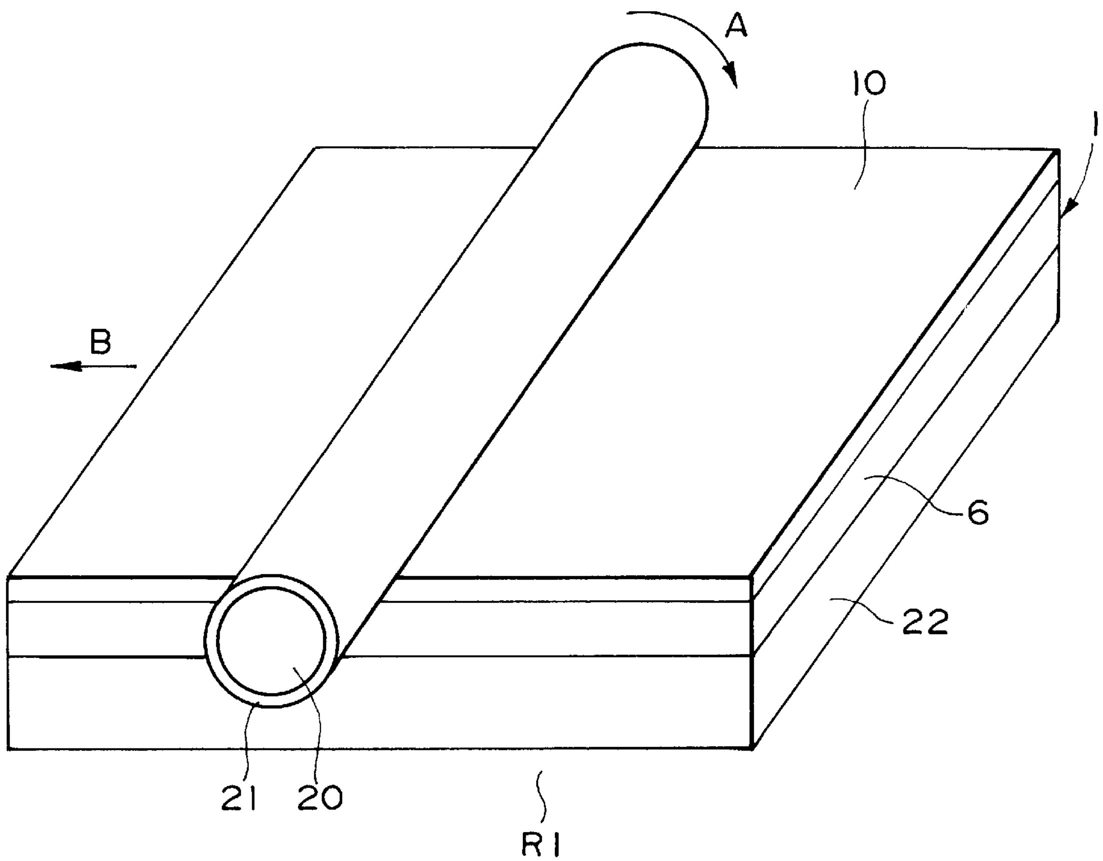
FIG. 2 is a perspective view for illustrating a conventional rubbing treating method.

Hereinbelow, preferred embodiments of the present invention will be explained specifically with reference to the drawings. In the following description, the same members are represented by identical reference numerals including those indicated in FIGS. 1 and 2 described above.

(First Embodiment)

A first embodiment, as a preferred embodiment, of a rubbing apparatus according to the present invention will be described with reference to FIGS. 3A and 3B and FIG. 4.

FIGS. 3A and 3B show a structure of a rubbing mask and stage of a rubbing apparatus R2 of the invention.

Referring to FIG. 3A, a rubbing mask 30 is formed in a (picture) frame-like form and has an opening part 30*a* in the center thereof. The rubbing mask 30 may be composed of a metal member, such as a stainless steel (SUS material) plate, preferably composed of a plural layers of laminating plate (e.g., four layers of laminations comprising 0.15 mm-thick SUS plate, 0.2 mm-thick SUS plate, 0.15 mm-thick SUS plate and 11 mm-thick SUS plate) in view of processability. In this instance, the 1.1 mm-thick SUS plate constitutes a frame portion of the rubbing mask 30 and the thickness (1.1 mm) is substantially equal to that of an electrode substrate 1*a*. The rubbing mask 30 has four corners each in the vicinity of which a vertical adsorption (or vertical suction) passage (suction passage) 30*b* and has a horizontal adsorption (or horizontal suction) passage (suction passage) 30*c* along the frame portion. At the lower section of the rubbing mask 30, another vertical suction (adsorption) passage 30*d* is formed. These suction passages 30*b*, 30*c* and 30*d* communicate with each other. The rubbing mask 30 is rounded at the respective corners and the surface of which is smoothly finished or coated with an organic film.

FIG. 3B shows a sectional structure (C1–C1' section of FIG. 3A) of a masked portion of the rubbing apparatus wherein the rubbing mask 30 covers the electrode substrate 1*a* mounted on a suction stage 50.

A rubbing apparatus R2 also includes a suction (adsorption) stage 50 on which a position of the electrode substrate and a position of the rubbing mask to be mounted are determined in advance. The suction stage 50 has a first suction passage 50*a* communicating with the vertical suction passage 30*b* formed in the vicinity of the corner of the rubbing mask 30 and has a second suction passage 50*c* so as to be directed to the lower surface of the electrode substrate 1*a*. These first and second suction passages 50*a* and 50*c* of the suction stage 50 are connected to a vacuum pump (not shown) so that the electrode substrate 1*a* and the rubbing mask 30 are sucked in air (or adsorbed) and held by the stage 50 so as not to be deviated from the prescribed positions. The first and second suction passages 50*a* and 50*c* are also designed so as to cause the rubbing mask 30 to closely contact (or be adsorbed by) the upper surface of the electrode substrate 1*a*, thus preventing an occurrence of a gap therebetween.

In this (first) embodiment, the rubbing treatment may be performed in the following manner.

Figure 4:
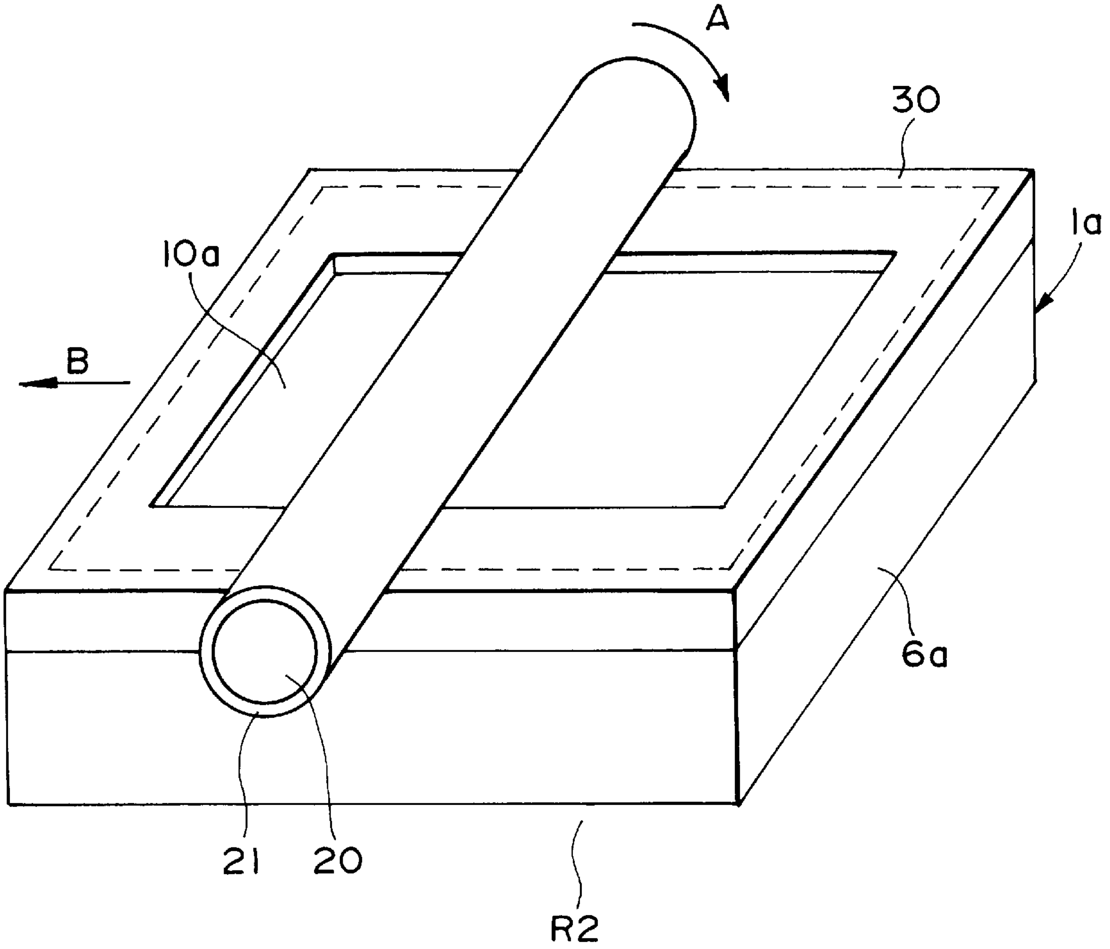
FIG. 4 is a perspective view for illustrating a rubbing treating method according to a first embodiment of the invention.

As shown in FIGS. 3B and 4, the electrode substrate 1*a* is mounted on the suction stage 50 on which the rubbing mask is further set. When the vacuum pump (not shown) is driven, air within and between the electrode substrate 1*a* and the rubbing mask 30 is sucked through the suction passages 50*a* and 50*c* of the suction stage 50. As a result, the electrode substrate 1*a* and the rubbing mask 30 are caused to closely contact and be held by the suction stage 50. In addition, the vertical suction passage 30*b* communicates with the first suction passage 50*a* as described above, so that air between the electrode substrate 1*a* and the rubbing mask 30 is also sucked via the horizontal suction passage 30*c* and another vertical suction passage 30*d*. As a result, the rubbing mask 30 closely covers or contacts the upper surface of the electrode substrate 1*a*. In this state, the rubbing treatment using a rubbing roller 20 is performed in the same manner as in the conventional rubbing method (FIG. 2) as shown in FIG. 4.

According to the first embodiment, the rubbing treatments can be partially effected with respect to a prescribed region, as desired, since a rubbing cloth 21 is not always rubbed against the entire surface of the electrode substrate 1*a*. More specifically, according to this embodiment, it is possible to stably impart an alignment control power to only a desired region of an alignment control film 10*a* with a good reproducibility. Accordingly, even in the case where an end section of an electrode substrate 1*a* is not covered with an alignment control film 10*a* to expose a transparent electrode group 7*a* as described above with respect to the related art, it is possible to obviate a contact between the electrode group 7*a* and the rubbing cloth 21 and also prevent abrasion of the rubbing cloth 21.

Further, in the case of imparting a particular alignment control power to only a particular region of an alignment control film by performing rubbing treatment of a prescribed region of the alignment control film, it is not necessary to use a vertical alignment material or different alignment control films. As a result, a film-forming process is simplified to reduce production costs and it is also possible to remedy a problem of an adverse influence or contamination on a principal alignment control film (portion).

Further, according to the first embodiment, the rubbing mask 30 and the electrode substrate 1*a* are surely held on the suction stage 50 through the suction passages 50*a* and 50*c* by suction (close contact) means, whereby a deviation or peeling-off of the rubbing mask from a prescribed position can be suppressed as mentioned above.

We have actually confirmed effects of the first embodiment of the present invention as follows.

A rubbing mask 30 having an elongated form (length=300 mm, width=10 mm) to which a plurality of suction passages (suction holes) 30*d* having a diameter of 2 mm with a pitch of 10 mm were provided was prepared. In this instance, a holding force in a vertical (or perpendicular) direction of at least 1 kgf and a holding force in a deviation (horizontal) direction of at least 100 g/mm were exerted, thus showing a sufficient holding performance. A time required to suction or adsorption was 2 seconds and a suction pressure was not changed, so that the rubbing mask 30 was caused to closely contact an electrode substrate 1*a*. Further, although dust generated by the rubbing treatment was located and accumulated at a mask edge (an end section of an opening part 10*a*), the dust was removed by air blowing not to be attached onto an alignment control film 10*a*. Further, when a liquid crystal display device was prepared by using the electrode substrate rubbing-treated by the rubbing apparatus according to the first embodiment, attachment of dust leading to alignment defects or irregularity in cell thickness was not observed.

Further, according to the first embodiment, it is possible to provide a rubbing apparatus with a more compact structure by designing a mechanism (suction passage 50*a*) for vacuum suction of a vertical suction passage 30*b* so as to also function as a suction passage 50*c* provided to the upper surface of a suction stage 50. More specifically, close contact between the electrode substrate 1*a* and the rubbing mask 30 and an adsorption (suction) of the rubbing mask to the suction stage can be performed by using an identical vacuum pump, thus simplifying the structure of the rubbing apparatus.

Figure 5:
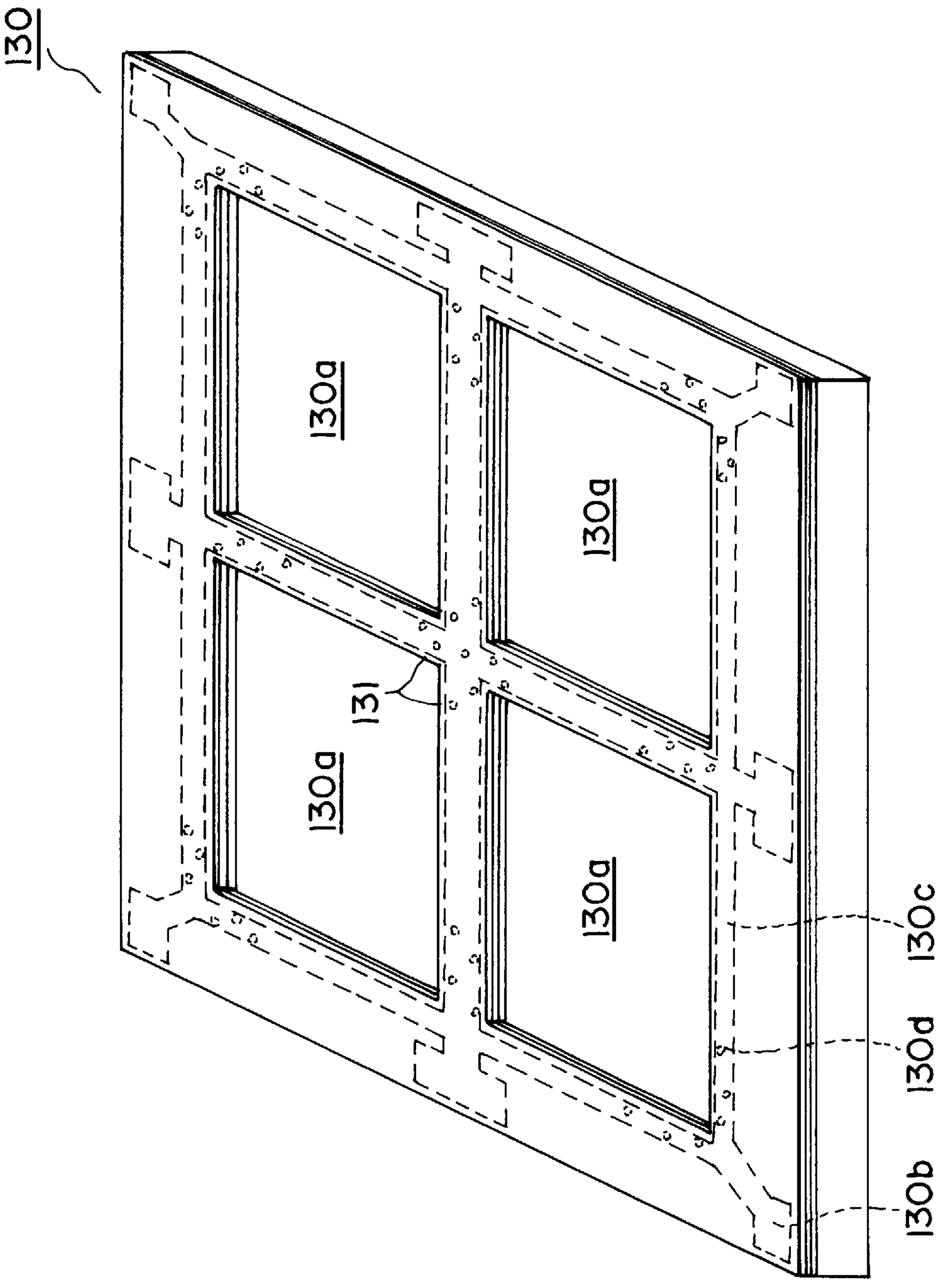
FIG. 5 is a perspective view for illustrating another rubbing mask usable in a first embodiment of the invention.

In the first embodiment, a single opening part 30*a* is used. However, in the present invention, a plural (e.g., four) opening parts 130*a* may be provided as shown in FIG. 5. As a result, it is possible to perform rubbing treatment to plural regions corresponding to plural electrode substrates at the same time, thus improving production efficiency. In this instance, it is preferred that suction passages 130*c* and 130*d* (corresponding to suction passages 30*c* and 30*d*, respectively, shown in FIG. 3B) are provided to elongated portions (strip portions) 131 in order to improve a close contact characteristic of the electrode substrate 1*a* with the rubbing mask 30.

(Second Embodiment)

Figure 6:
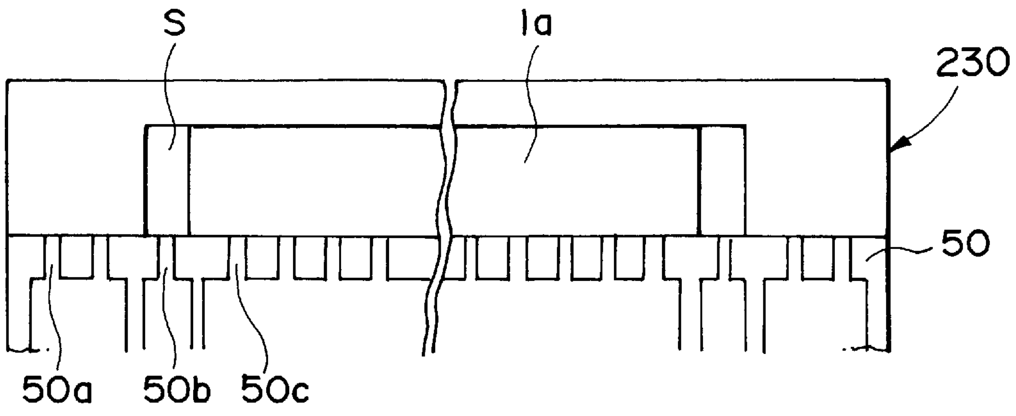
FIGS. 6 and 7 are respectively a sectional view for illustrating a rubbing treating apparatus used in a second embodiment and a third embodiment, respectively, according to the invention.

A second embodiment of the present invention will be described with reference to FIG. 6 showing a rubbing apparatus including an electrode substrate 1*a*, a rubbing mask 230, and a suction stage 50.

Referring to FIG. 6, the rubbing mask 230 has a two-layer lamination structure (e.g., comprising a 0.1 mm-thick plate and a 1.1 mm-thick plate) but is not provided with suction passages 30*b*, 30*c* and 30*d* as employed in the above-mentioned first embodiment. In this embodiment, a space or gap S between the side wall of the electrode substrate 1*a* and the rubbing mask 230 is utilized as a suction passage. A close contact characteristic between the electrode substrate 1*a* and the rubbing mask 230 is ensured by sucking the air within the gap S through a suction passage 50*b* communicating with the gap S.

In the second embodiment, it is assumed that a damage to pile yarn planted to a rubbing cloth is alleviated by increasing a length of the pile yarn since the pile yarn is liable to be deteriorated in the case of using a thick rubbing mask (e.g., 0.5 mm at the portion on the electrode substrate 1*a*). However, the increase in length of the pile yarn is not necessarily desirable in order to surely perform aligning treatment. In the second embodiment, however, the rubbing mask 230 can be composed of the two-layer lamination plate, thus being thinned compared with that (four-layer lamination plate) used in the first embodiment. As a result, the above difficulty (deterioration of the pile yarn) can be obviated. The production of the rubbing mask 230 is simplified in view of its processability.

According to the second embodiment, similar advantages as described in the first embodiment can be attained.

The rubbing mask 230 used in the second embodiment may be composed of a three-layer lamination plate. Further, in the second embodiment, it is possible to provide the rubbing mask 230 with a suction passage by groove processing according to half etching, etc.

(Third Embodiment)

Figure 7:
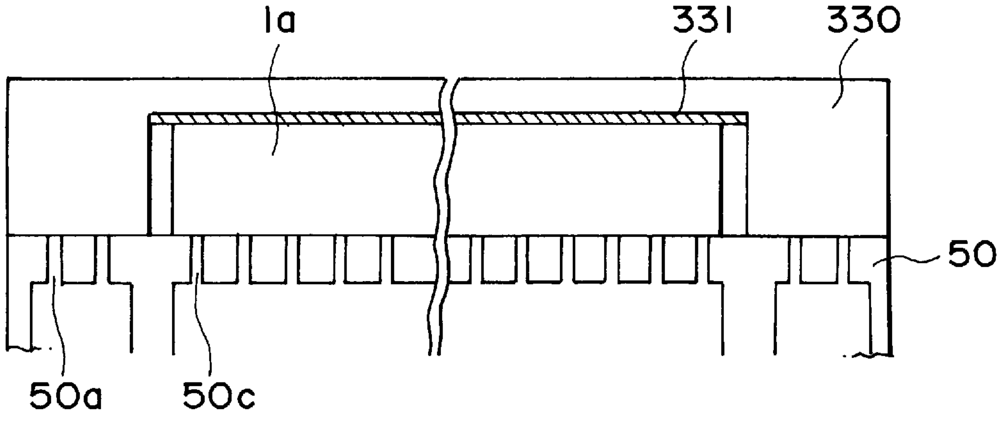

FIG. 7 illustrates a third embodiment of the present invention.

Referring to FIG. 7, a rubbing mask 330 has a two-layer lamination structure (e.g., comprising a 0.3 mm-thick plate and a 1.05 mm-thick plate). A close contact between an electrode substrate 1*a* and the rubbing mask 330 is not ensured by air suction as employed in the first and second embodiments described above but is attained by utilizing flexure or flexibility of the rubbing mask 330 per se. At the lower portion of the rubbing mask 330 (a portion contacting the side of the electrode substrate 1*a*), a coating layer 331 composed of a silicone-containing resin or a fluorine-containing resin is formed in order to enhance the close-contact characteristic.

According to the third embodiment, the resultant rubbing apparatus is excellent in the close-contact characteristic of the rubbing mask with the electrode substrate, so that a vacuum pump used in this embodiment is reduced in volume and a time required for effecting close contact is saved or omitted.

Further, according to the third embodiment, advantages as obtained by the first embodiment are attained similarly as in the second embodiment.

(Fourth Embodiment)

A fourth embodiment of the present invention will be explained with reference to FIG. 8 and FIGS. 9A, 9B and 9C.

Figure 8:
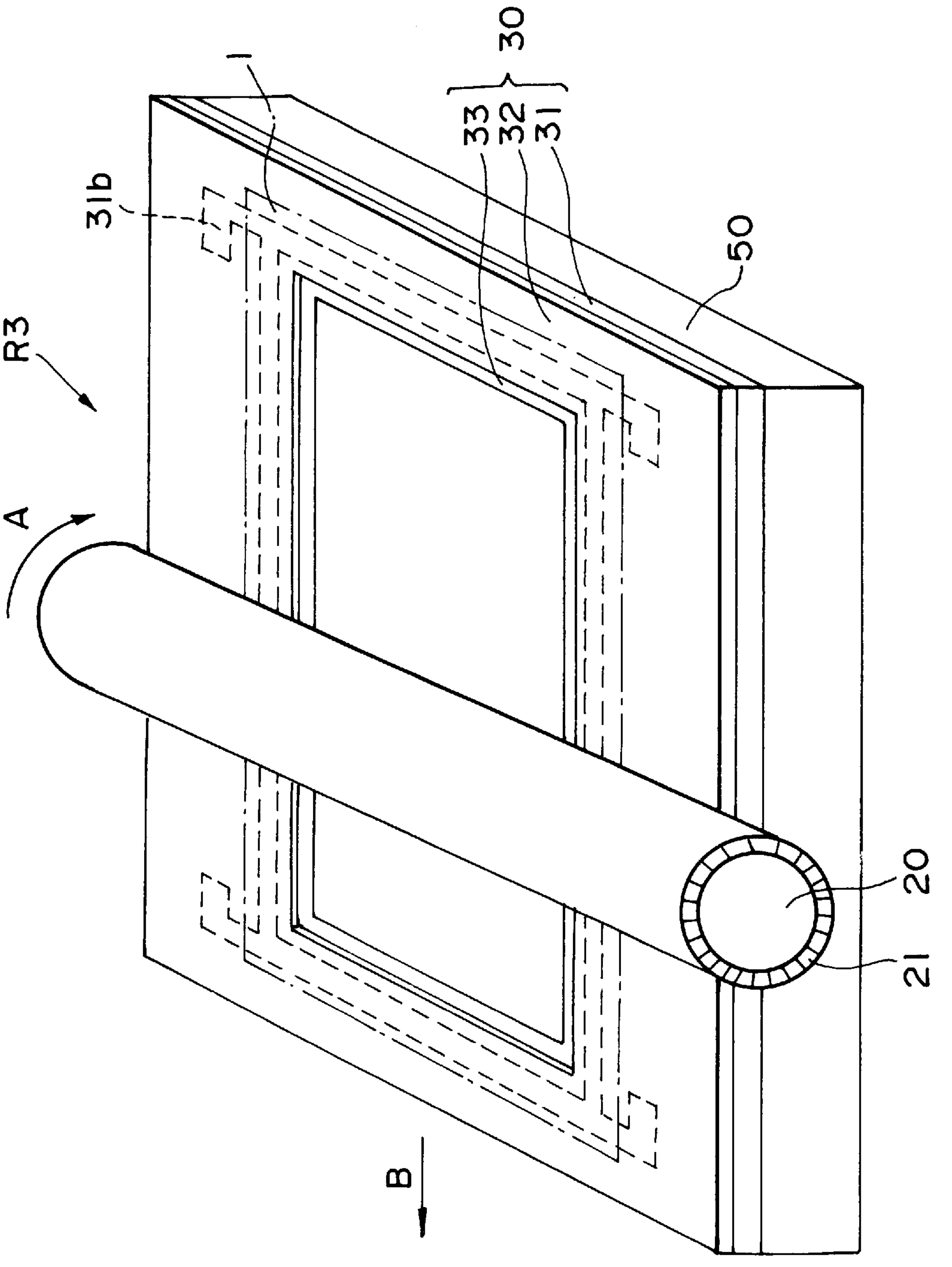
FIG. 8 is a perspective view for illustrating a structure of a rubbing treating apparatus according to a fourth embodiment of the invention.

FIG. 8 shows a rubbing apparatus R3 used in this embodiment. Referring to FIG. 8, similarly as in the conventional rubbing apparatus R1 described hereinabove, the rubbing apparatus R3 include a rubbing roller 20, a rubbing cloth 21 wound about the rubbing roller 20, an electrode substrate 1, a suction stage (substrate stage) 50, and a motor (not shown).

Figure 9A:
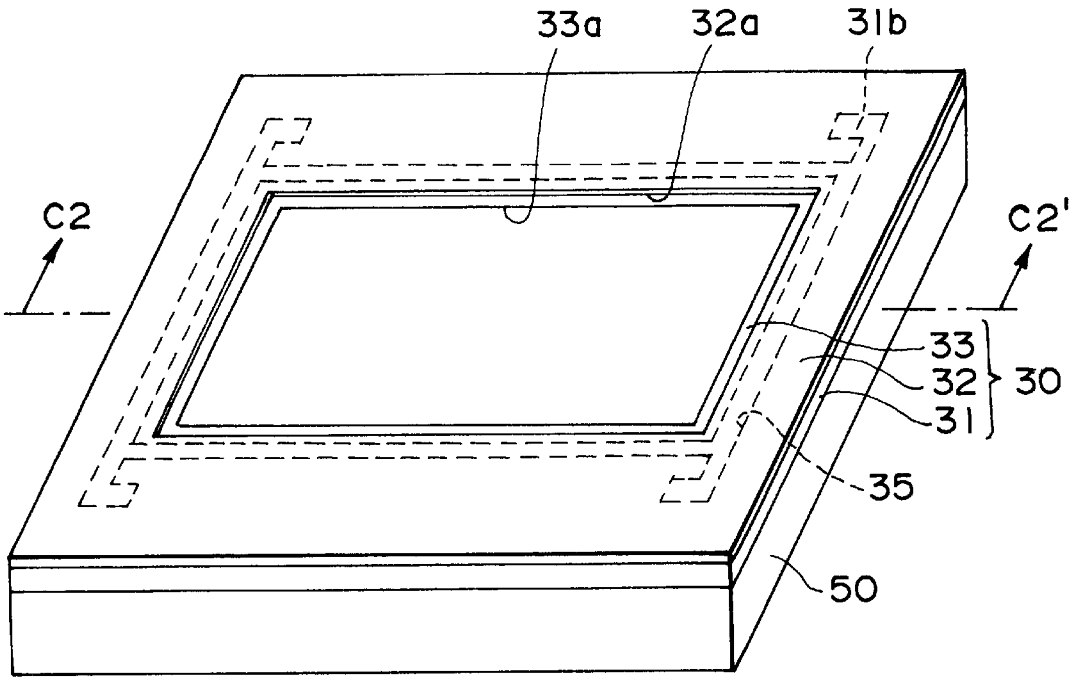
Figure 9B:
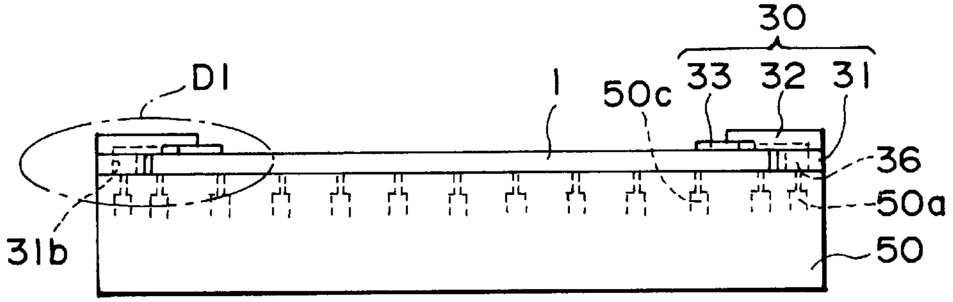
Figure 9C:
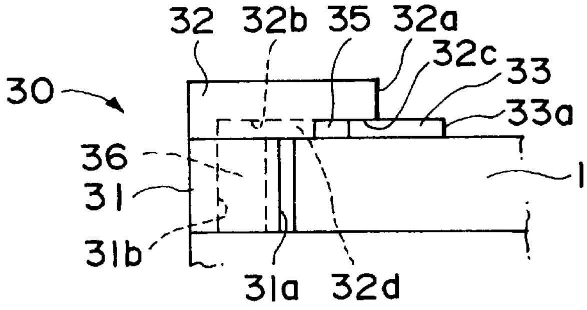

The rubbing apparatus further includes a rubbing mask 30 as shown in FIG. 8 and FIGS. 9A–9C including a perspective view (FIG. 9A), a sectional view of C2–C2' section (FIG. 9B) and an enlarged sectional view of D1 portion (FIG. 9C).

Referring to these figures, the rubbing mask 30 includes three sections including a frame part 31 as a first part, a pressing part 32 as a second part and an edge part 33 as a third part, and each of which may be composed of, e.g., a stainless steel plate (SUS material) and provided with an opening 31*a*, 32*a* or 33*a*, respectively. These sections (frame part 31, pressing part 32 and edge part 33) are formed in a frame-like shape as a whole as shown in FIG. 8 or FIG. 9A.

The frame part 31 has a thickness (e.g., about 1.1 mm) substantially identical to that of the electrode substrate 1 (1*a* or 1*b*) but has a size somewhat larger than that of the electrode substrate at the opening 31*a*. Accordingly, in a state shown in FIG. 9B, the frame part 31 surrounds the electrode substrate 1.

The pressing part 32 is laminated or superposed on the upper surface of the frame part 31 and has the opening 32*a* having a size somewhat smaller than that of the electrode substrate 1. A part of the pressing part 32 covers the sides of the electrode substrate 1. The pressing part 32 has a thickness (e.g.,. about 0.4 mm) smaller than that (e.g., about 1.1 mm) of the frame part 31.

The frame part 31 has a through-hole 31*b* (hereinbelow referred to as "vacuum suction port 31b") opening to the upper and lower surfaces of the frame part 31 and the pressing part 32 has a groove portion 32*b* extending toward the inner side of the rubbing mask 30 (the right side in FIG. 9C) at the lower surface of the pressing part 32. The groove portion 32*b* is formed by half etching and communicates with the vacuum suction port 31*b*. At the inside and lower surface of the pressing part 32, i.e., a portion opposite to the electrode substrate 1, a region along the lower side (or end section preferably having a thickness of at most 0.25 mm) of the opening 32*a* is removed by half etching (hereinbelow, such a removed portion is referred to as "removal portion 32c". The removal portion 32*c* is formed inside the side of the electrode substrate as shown in FIG. 9C and a part 32*d* of the pressing part 32 abuts against the electrode substrate 1. The part 32*d* may preferably have a thickness of, e.g., at most 0.25 mm, more preferably 0.1 mm. At the removal portion 32*c*, the edge part 33 having a thickness identical to that of the part 32*d* is disposed by laminating adhesion so as to leave a groove portion 35 (hereinbelow, referred to as "vacuum suction-guiding passage 35") while not all the removal portion 32*c* is sealed or plugged. The vacuum suction-guiding passage 35 successively communicate with the groove portion 32*b* and the vacuum suction port 31*b* to constitute a suction passage 36 and also is directed to the electrode substrate 1 as shown in FIG. 9C.

The edge part 33 has an opening 33*a* defining a rubbing region of an alignment control film and abuts on or closely contacts the electrode substrate 1 in the state as shown in FIG. 9C.

In the fourth embodiment, the rubbing mask 30 has the opening 33*a* and is formed in a frame-like shape, so that the rubbing mask set as described above covers at least a part (side sections) of the electrode substrate 1.

On the other hand, the rubbing apparatus R3 as shown in FIG. 8 include the substrate (suction) stage 50 on which a position of the electrode substrate 1 to be mounted and a position of the rubbing mask 30 to be mounted are determined in advance. The substrate stage 50 has a lot of vacuum suction passages 50*a* and 50*c* as shown in FIG. 9B. Among these passages, the vacuum suction passage 50*a* formed in the vicinity of the peripheral side of the substrate stage 50 communicates with the vacuum suction port 31*b*. On the other hand, the respective vacuum suction passages 50*c* formed inside the substrate stage 50 are directed to the corresponding position of the electrode substrate 1. Other openings (not shown) of these passages 50*a* and 50*c* are connected to a vacuum pump (not shown) as suction means.

In the fourth embodiment, the suction passage 36 of the rubbing mask 30 is connected with the vacuum pump via the vacuum suction passage 50*a*. As a result, the suction passage 36, the vacuum suction passage 50*a* and the vacuum pump (not shown) function as holding (or close-contact) means as a whole. The holding means causes the rubbing mask 30 to closely contact the electrode substrate 1 and the substrate stage 50 at the time of rubbing treatment.

The rubbing treatment in the fourth embodiment may be performed as follows.

The electrode substrate 1 and the rubbing mask 30 are disposed (or mounted) in the respective prescribed positions of the substrate stage 50. When the vacuum pump is driven, the electrode substrate 1 and the rubbing mask are caused to closely contact the substrate stage 50 by vacuum suction. At this time, air inside the vacuum suction-guiding passage 35, i.e., air between the electrode substrate 1 and the rubbing mask is sucked by the vacuum pump because the vacuum suction-guiding passage 35 communicates with the vacuum suction passage 50*a* through the groove portion 32*b* and the vacuum suction port 31*b*. As a result, a suction (or adsorption) force is generated between the electrode substrate surface and the rubbing mask surface, thus causing the rubbing mask 30 to closely contact the electrode substrate surface.

Then, the rubbing roller 20 is caused to abut against an alignment control film 10 (10*a* or 10*b*) with a prescribed pressing force (or depth) and is rotated in a direction of an arrow A as shown in FIG. 8. Thereafter, the substrate stage 50 is moved horizontally (in parallel relative to the rubbing roller 20) in a direction of an arrow B at a contact speed (as shown in FIG. 8). Consequently, the surface of the alignment control film is rubbed in one direction to perform a uniform aligning treatment with respect to a prescribed region of the alignment control film 10.

According to the fourth embodiment, it is possible to stably impart an alignment control power to only a desired region of an alignment control film 10 since the rubbing treatments can be effected by using the rubbing mask 30 as described above.

Accordingly, even in the case where an end section of an electrode substrate 1 is not covered with an alignment control film 10 to expose a transparent electrode group 7 (7*a* or 7*b*), it is possible to obviate a contact between the electrode group 7 and the rubbing cloth 21 and also prevent abrasion of the rubbing cloth 21.

Further, in the case of imparting a particular alignment control power to only a particular region of an alignment control film by performing rubbing treatment of a prescribed region of the alignment control film as described above with respect to the related art, it is not necessary to use a vertical alignment material or different alignment control films. As a result, a film-forming process is simplified to reduce production costs and it is also possible to remedy a problem of an adverse influence or contamination on a principal alignment control film (portion).

Further, according to the fourth embodiment, the rubbing mask 30 may have an end section having a thickness of, e.g., 0.1 mm to minimize a difference in height caused by the rubbing mask 30, thus preventing uneven rubbing (rubbing irregularity) leading to alignment defects.

Further, according to the fourth embodiment, the rubbing mask 30 and the electrode substrate 1 are surely caused to closely contact and held on the suction stage 50 through the suction passages 50*a* and 50*c* by holding means, whereby a deviation or peeling-off of the rubbing mask 30 from a prescribed position can be suppressed. Accordingly, a gap between the rubbing mask 30 and the alignment control film 10 is not formed during the rubbing treatment, thus suppressing an occurrence of alignment defects and abrasion of the rubbing cloth 21.

Incidentally, the effect of preventing the deviation or peeling-off of the rubbing mask 30 is not affected by a thickness or an opening area of the rubbing mask 30. Accordingly, it is possible to produce a large-sized liquid crystal display device free from alignment defects by using a rubbing mask 30 having a large opening area. In the fourth embodiment, the rubbing treatment may be performed with respect to plural regions of a single electrode substrate by using a rubbing mask provide with plural opening parts and then cutting the electrode substrate, whereby a plurality of electrode substrates were prepared to improve production efficiency.

We have actually confirmed effects of the fourth embodiment of the present invention in the following manner.

A rubbing mask 30 (outer size of 500 mm×500 mm) having an opening part (size of 250 mm×300 mm) and a vacuum suction-guiding passage 35 having a height (or depth) of 0.15 mm was prepared. Then, as described above, when an electrode substrate 1 and the rubbing mask 30 were caused to closely contact a substrate stage 50, the rubbing mask 30 was found to form a difference in height of about 0.12 mm. Further, when a liquid crystal display device was prepared by performing rubbing treatment with the rubbing mask 30, alignment defects leading to a deviation of extinction position or a lowering in contrast were not observed, thus exhibiting a uniform alignment state over the entire area of the liquid crystal display device.

Figure 10A:
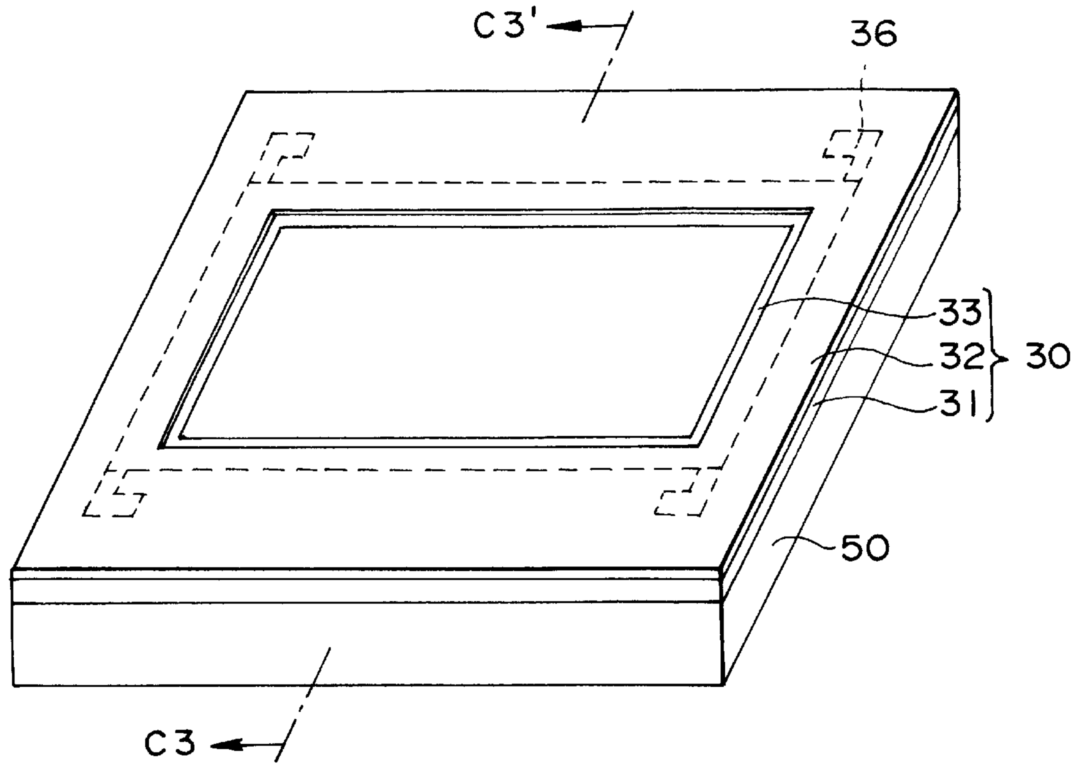
Figure 10B:
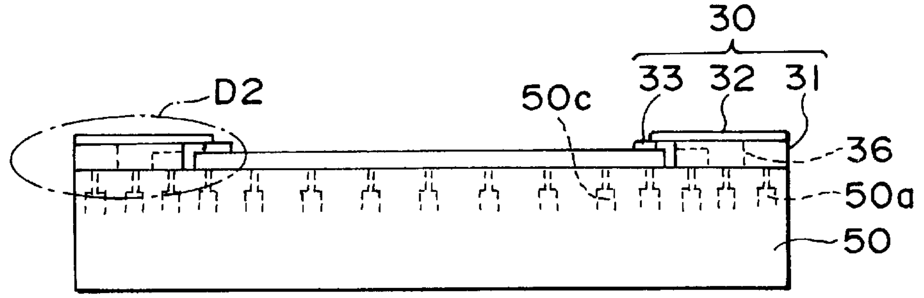
Figure 10C:
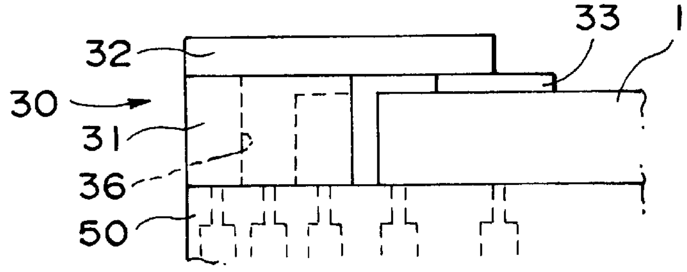

In the fourth embodiment, the vacuum suction-guiding passage 35 is disposed so as to be directed to only the upper surface of the electrode substrate 1 but may be disposed so as to be directed to an entire gap between the frame part 31 and the electrode substrate 1 as shown in FIGS. 10A–10C. More specifically, a rubbing apparatus shown in FIGS. 10A–10C may, e.g., include a 1.1 mm-thick electrode substrate 1, a 1.2 mm-thick frame part 31, a 0.3 mm-thick pressing part 32, a 0.1 mm-thick edge part 33, and a suction passage 36 opening into the entire gap between the frame part 31 and the electrode substrate 1 including the space formed at the upper surface of the electrode substrate 1. According to this embodiment, an additional processing such as half etching can be omitted to reduce the production cost.

Figure 11A:
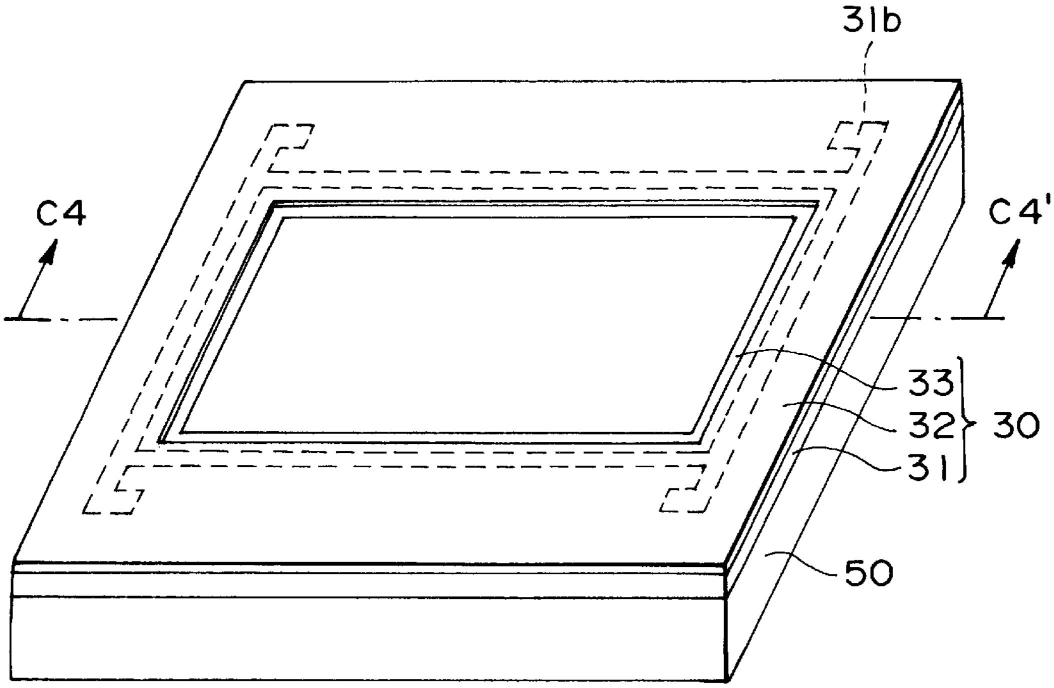
Figure 11B:
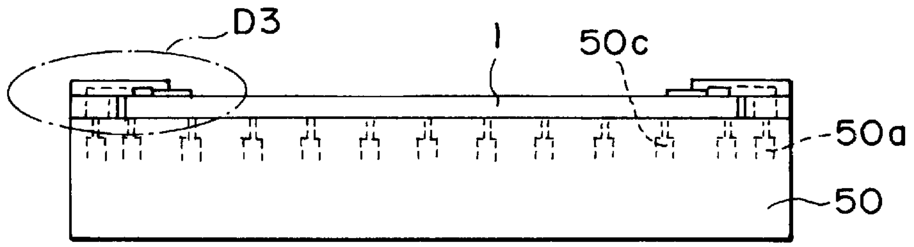
Figure 11C:
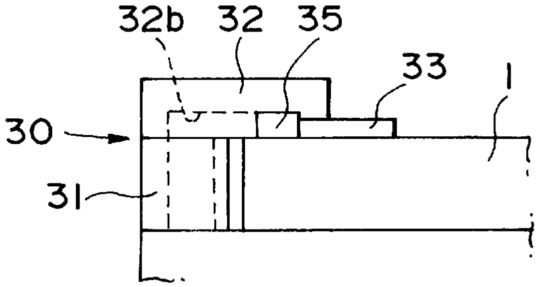

In the fourth embodiment including the above embodiment as shown in FIGS. 10A–10C, it is possible to set a thickness (height) of the groove portion 32*b* to be 0.1 mm and set a thickness (height) of the vacuum suction-guiding passage 35 to be 0.3 mm. However, these thicknesses may be designed to be thick (or large) as shown in FIGS. 11A–11C. In such a case, however, the pressing part 32 at a portion facing to the groove portion 32*b* and the passage 35 may preferably be required to have a thickness of at least 0.175 mm. In this instance, if the thickness of the pressing part 32 (at a portion under which the groove portion 32*b* and the passage 35 are not formed) is set to be about 0.4 mm, the thicknesses of the groove portion 32*b* and vacuum suction-guiding passage 35 are required to be below 0.225 mm as a result.

According to our experiment, it has been confirmed that a pressing part 32 was deformed by vacuum suction to separate or part an edge part 33 from an electrode substrate 1 in the case of using a grooving portion 32*b* and vacuum suction-guiding passage each having a height of at least 0.225 mm, i.e., in the case of using the pressing part 32 having a thickness of below 0.175 mm. At this time, the edge part 33 was found to form a difference in height of about 0.25 mm. When a liquid crystal display device prepared by using the thus rubbing-treated electrode substrate was driven, it has been confirmed that a poor contrast region with a width of c.a. 1 mm was observed at the position causing the height difference.

In the fourth embodiment, the substrate stage 50 is rotated in the direction B but the rubbing roller 20 may also be rotated in the direction B. It is also possible to move (or rotate) the substrate stage 50 and the rubbing roller 20 in the directions opposite to each other.

(Fifth Embodiment)

Then, a fifth embodiment will be explained with reference to FIGS. 12A–12C and FIG. 13.

Figure 12A:
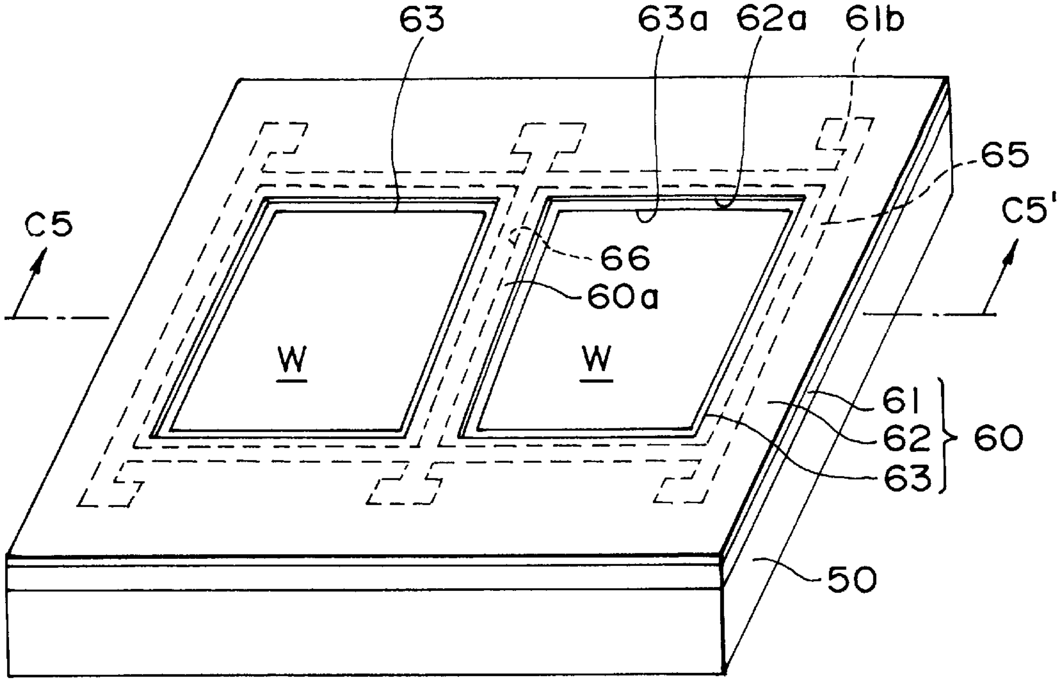
Figure 12B:
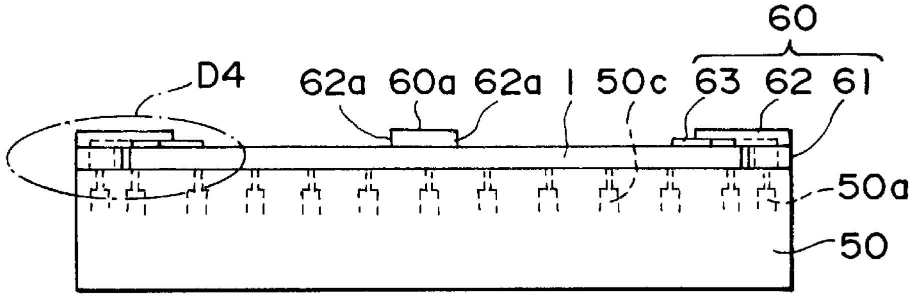
Figure 12C:
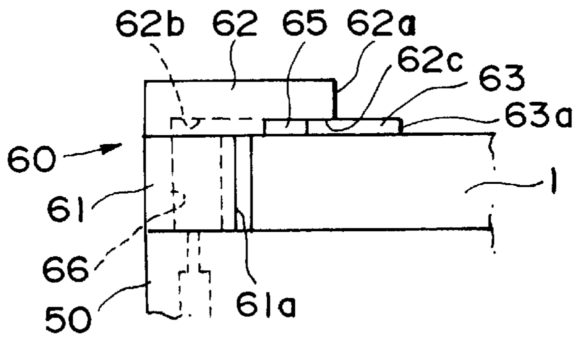
Figure 13:
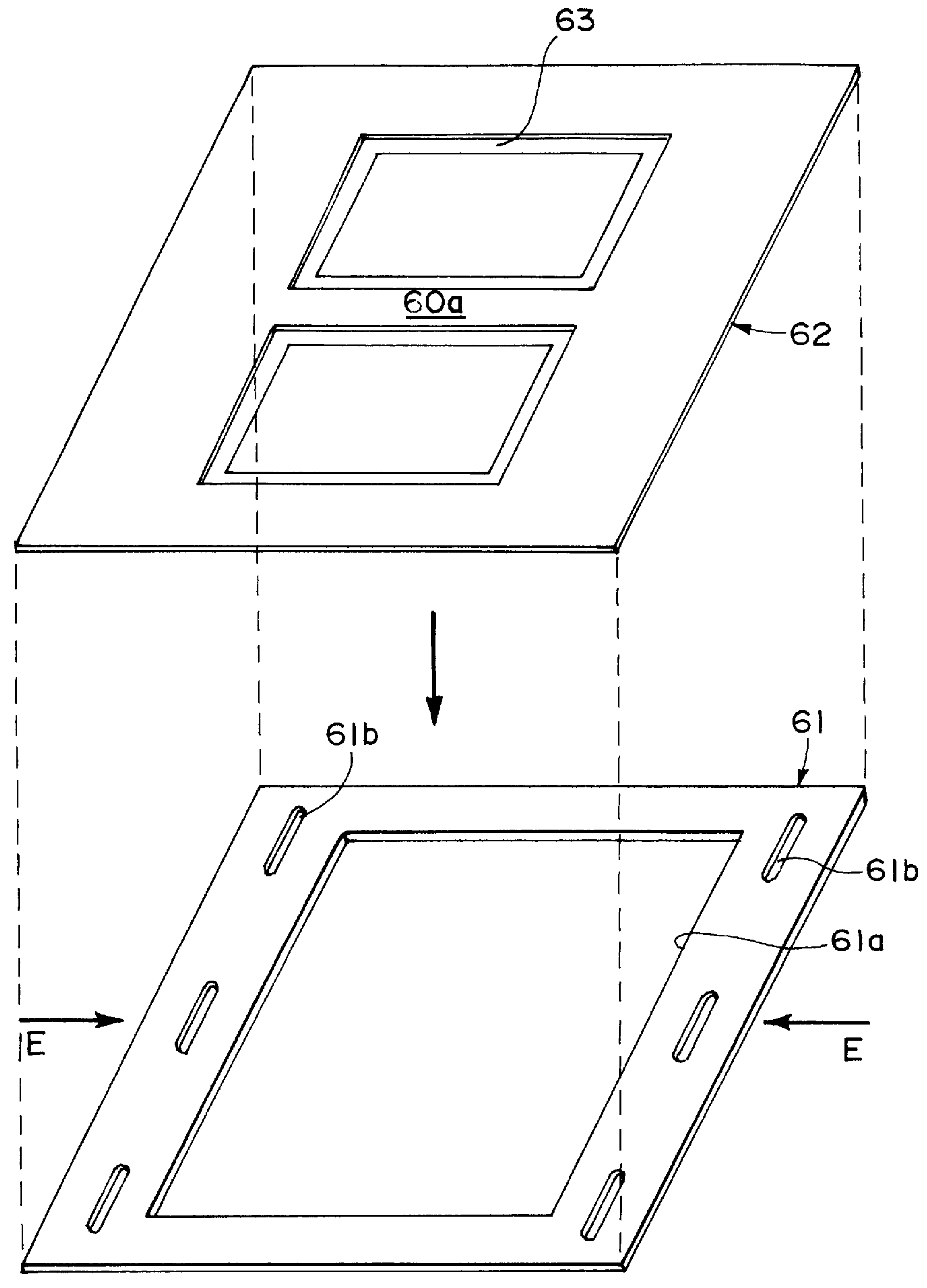
FIG. 13 is an exploded perspective view of a rubbing mask used in a fifth embodiment according to the invention.

FIG. 12A is a perspective view of a rubbing apparatus (particularly a rubbing mask and a substrate stage) used in this embodiment, FIG. 12B shows a sectional structure taken along C5–C5' line of FIG. 12A, and FIG. 12C shows a partly enlarged sectional structure of D4 part in FIG. 12B. FIG. 13 is an exploded perspective view of a rubbing mask used in this embodiment.

Referring to FIG. 12A, a rubbing mask 60 is used for performing rubbing treatment with respect to two regions at the same time, thus being provided with two opening part (W, W) defined by an elongated strip portion 60*a* having a width of c.a. 30 mm.

The rubbing mask 60 is composed of a stainless steel plate (SUS material), and includes a frame part 61 as a first part, a pressing part 62 as a second part and an edge part 63 as a third part as shown in FIGS. 12A–12C.

The frame part 61 has an opening 61*a* and a through-hole (vacuum suction port) 61*b* along the opening 61*a* and is formed in a (picture) frame shape as shown in FIG. 13. The frame part 61 has a thickness of, e.g., about 1.1 mm substantially identical to that of the electrode substrate 1 and has a size somewhat larger than that of the electrode substrate 1 at the opening 61*a*. Accordingly, in a state shown in FIG. 12B, the frame part 61 is disposed so as to surround the electrode substrate 1.

The pressing part 62 is laminated or superposed on the upper surface of the frame part 61 and is provided with two openings (62*a*, 62*a*). At the lower surface of the pressing part 62, a groove portion 62*b* and a removal portion 62*c* are disposed similarly as in the fourth embodiment described above. At the removal portion 62*c*, the edge part 63 is disposed by laminating adhesion so as to leave a groove portion (vacuum suction-guiding passage) 65 as shown in FIG. 12C. The pressing part 62 is thinner than the frame part 61 and is designed to have a thickness of, e.g., about 0.4 mm. The edge part 63 is set to have a thickness of, e.g., about 0.1 mm. The groove portion 62*b* and vacuum suction-guiding passage 65 are respectively set to have a depth (or height) of, e.g., about 0.1 mm. The vacuum suction part 61*b*, the groove portion 62*b* and the vacuum suction-guiding passage 65 constitute a suction passage 66 as a whole. The suction passage 66 is also provided to the elongated strip portion 60*a*.

As described above, the pressing part 62 and frame part 61 are applied to each other by laminating adhesion. Such a laminating adhesion is performed after deforming the frame part 61 in the directions of arrows (E, E) as shown in FIG. 13. The directions (E, E) are identical to a longitudinal direction of the elongated strip portion 60*a*, so that, after the adhesion, a residual tension stress is exerted on the elongated strip portion 60*a* each in a direction opposite to the direction E. As a result, looseness or deformation of the elongated strip portion 60*a* is prevented.

Other structures of the rubbing apparatus used in the fifth embodiment are similar to those as employed in the above fourth embodiment. More specifically, the rubbing roller includes a rubbing roller, a rubbing cloth and a motor (respectively not shown in FIGS. 12A–12C and 13). The substrate stage 50 is provided with vacuum suction passages 50*a* and 50*c* as shown in FIG. 12B.

Among these passages, the vacuum suction passage 50*a* formed in the vicinity of the peripheral side of the substrate stage 50 communicates with the vacuum suction port 61*b* in such a state that the rubbing mask 60 is mounted. On the other hand, the respective vacuum suction passages 50*c* formed inside the substrate stage 50 are directed to the corresponding positions of the electrode substrate 1. Other openings (not shown) of these passages 50*a* and 50*c* are connected to a vacuum pump (not shown) as suction means.

In the fifth embodiment, the suction passage 66 of the rubbing mask 60 is connected with the vacuum pump via the vacuum suction passage 50*a*. As a result, the suction passage 66, the vacuum suction passage 50*a* and the vacuum pump (not shown) function as holding (or close-contact) means as a whole. The holding means causes the rubbing mask 60 to closely contact the electrode substrate 1 and the substrate stage 50 at the time of rubbing treatment.

The rubbing treatment in the fifth embodiment may be performed as follows.

The electrode substrate 1 (1*a* or 1*b*) and the rubbing mask 60 are disposed (or mounted) in the respective prescribed positions of the substrate stage 50. When the vacuum pump is driven, the electrode substrate 1 and the rubbing mask 60 are caused to closely contact the substrate stage 50 by vacuum suction. At this time, air inside the vacuum suction-guiding passage 65, i.e., air between the electrode substrate 1 and the rubbing mask 60 is sucked by the vacuum pump because the vacuum suction-guiding passage 65 communicates with the vacuum suction passage 50*a* through the groove portion 62*b* and the vacuum suction port 61*b*. As a result, a suction (or adsorption) force is generated between the electrode substrate surface and the rubbing mask surface, thus causing the rubbing mask 60 to closely contact the electrode substrate surface. In this instance, the elongated strip portion 60*a* is also sucked to contact the electrode substrate 1 because the elongated strip portion 60*a* is provided with the suction passage 66 as shown in FIG. 12A.

Then, in the same manner as in the fourth embodiment (FIG. 8), the rubbing roller 20 is caused to abut against an alignment control film 10 (10*a* or 10*b*) with a prescribed pressing force (or depth) and is rotated in a direction of an arrow A as shown in FIG. 8. Thereafter, the substrate stage 50 is moved horizontally (in parallel relative to the rubbing roller 20) in a direction of an arrow B at a contact speed (as shown in FIG. 8). Consequently, the surface of the alignment control film 10 is rubbed in one direction to perform a uniform aligning treatment with respect to a prescribed region of the alignment control film 10.

According to the fifth embodiment of the present invention, it is possible to effect rubbing treatment of two regions at the same time. Accordingly, when the thus-treated electrode substrate 1 is appropriately cut, two electrode substrates can be prepared by a single rubbing treatment, thus resulting in an improved production efficiency.

According to the fifth embodiment, it is possible to stably impart an alignment control power to only a desired region of an alignment control film 10 since the rubbing treatments can be effected by using the rubbing mask 60 as described above.

Accordingly, even in the case where an end section of an electrode substrate 1 is not covered with an alignment control film 10 to expose a transparent electrode group 7 (7*a* or 7*b*), it is possible to obviate a contact between the electrode group 7 and the rubbing cloth 21 and also prevent abrasion of the rubbing cloth 21.

Further, in the case of imparting a particular alignment control power to only a particular region of an alignment control film by performing rubbing treatment of a prescribed region of the alignment control film as described above with respect to the related art, it is not necessary to use a vertical alignment material or different alignment control films. As a result, a film-forming process is simplified to reduce production costs and it is also possible to remedy a problem of an adverse influence or contamination on a principal alignment control film (rubbing portion).

Further, according to the fifth embodiment, the rubbing mask 60 may have an end section having a thickness of, e.g., about 0.1 mm to minimize a difference in height caused by the rubbing mask 60, thus preventing uneven rubbing (rubbing irregularity) leading to alignment defects.

Further, according to the fifth embodiment, the rubbing mask 60 is caused to closely contact the electrode substrate by the action of the suction passage 66. On the other hand, the elongated strip portion 60*a* retains its stiffness to some extent by the action of a residual tensile stress and is also provided with the suction passage 66 to be sucked to closely contact the electrode substrate 1. Accordingly, during the rubbing treatment, a deviation or peeling-off of the rubbing mask 60 can be prevented. As a result, a space or gap between the rubbing mask 60 and the alignment control film 10 is not formed, thus suppressing an occurrence of alignment defects and abrasion of the rubbing cloth 21.

With respect to the alignment defect, the following experiment was conducted.

A rubbing mask 60 was prepared by laminating (adhesion) of a frame part 61 onto a pressing part 62 in a state such that the frame part is deformed or stressed by 50 $\mu$m in a direction of an arrow E at two sides of the frame part 61 as shown in FIG. 13. The thus-prepared rubbing mask was subjected to rubbing treatment of six electrode substrates, so that a partial separation (or peeling-off) of the rubbing mask 60 was not observed, thus resulting in a good rubbing treatment. When a liquid crystal display device was prepared by using the thus-treated electrode substrates and was driven, no alignment defects were observed.

On the other hand, when six electrode substrates were subjected to rubbing treatment with an ordinary rubbing mask having an elongated strip portion 60*a* on which a residual tensile stress was not exerted, the elongated strip portions 60*a* was found to have a partially peeled (or separated) portion of 2–4 mm. Further, when these electrode substrates were subjected to production of a liquid crystal display device, alignment defects were confirmed.

(Sixth Embodiment)

Then, a sixth embodiment will be explained with reference to FIGS. 14A and 14B.

FIG. 14A is a perspective view of a rubbing apparatus R4 (particularly a rubbing mask 70 and a substrate stage 90) used in this embodiment, and FIG. 14B shows a sectional structure taken along C6–C6' line of FIG. 14A.

The rubbing apparatus R4 used in this embodiment is provided with a rubbing mask 70 as shown in FIG. 14A. The rubbing mask 70 is provided with a frame part 71 and a pressing part 72 as shown in FIGS. 14A and 14B.

The frame part 71 is composed of a stainless steel plate (SUS material) and provided with an opening 71*a* so as to form a (picture) frame-like shape.

The frame part 71 has a thickness of, e.g., about 1.1 mm substantially identical to that of the electrode substrate 1 and has a size somewhat larger than that of the electrode substrate 1 at the opening 71*a*. Accordingly, in a state shown in FIG. 14B, the frame part 71 is disposed so as to surround the electrode substrate 1.

The pressing part 72 is composed of, e.g., a 1.1 mm-thick stainless steel (SUS 420) plate as a paramagnetic material and is laminated or applied onto the upper surface of the frame part 71. The pressing part 72 is provided with an opening 72*a* smaller than an electrode substrate 1 in size, whereby a prescribed region of the electrode substrate 1 is exposed for rubbing treatment and another region is covered by the pressing part 72.

A substrate stage 90 is provided with plural vacuum suction passages 90*a* as shown in FIG. 14B.

The vacuum suction passages 90*a* are directed to the corresponding upper surfaces of the substrate stage 90. Other openings (not shown) of these passages 90*a* are connected to a vacuum pump (not shown). As shown in FIG. 14A, at the upper surface of the substrate stage 90, a lot of magnets 91 as a holding (close-contact) means are embedded in the substrate stage 90. These magnets 91 are disposed along the sides of the electrode substrate 1 so as to be closest to the pressing part 72 and cause the pressing part 72 to closely contact the surface of the electrode substrate 1 due to the magnetic force.

Hereinbelow, rubbing treatment in this embodiment will be described.

When the electrode substrate 1 (1*a* or 1*b*) and the rubbing mask 70 are placed or mounted in respective prescribed positions on the substrate stage 90, the pressing part 72 of the rubbing mask 70 is caused to closely contact the electrode substrate 1 by the action of the magnetic force of the magnets 91. Then, when the vacuum pump is driven, the electrode substrate 1 and the rubbing mask 70 are caused to closely contact the substrate stage 90 through the vacuum suction passages 90*a* by vacuum suction.

Then, in the same manner as in the fourth embodiment (FIG. 8), the rubbing roller 20 is caused to abut against an alignment control film 10 (10*a* or 10*b*) with a prescribed pressing force (or depth) and is rotated in a direction of an arrow A as shown in FIG. 8. Thereafter, the substrate stage 90 is moved horizontally (in parallel relative to the rubbing roller 20) in a direction of an arrow B at a contact speed (as shown in FIG. 8). Consequently, the surface of the alignment control film 10 is rubbed in one direction to perform a uniform aligning treatment with respect to a prescribed region of the alignment control film 10.

According to the sixth embodiment, it is possible to stably impart an alignment control power to only a desired region of an alignment control film 10 since the rubbing treatments can be effected by using the rubbing mask 70 as described above.

Accordingly, even in the case where an end section of an electrode substrate 1 is not covered with an alignment control film 10 to expose a transparent electrode group 7 (7*a* or 7*b*), it is possible to obviate a contact between the electrode group 7 and the rubbing cloth 21 and also prevent abrasion of the rubbing cloth 21.

Further, in the case of imparting a particular alignment control power to only a particular region of an alignment control film by performing rubbing treatment of a prescribed region of the alignment control film as described above with respect to the related art, it is not necessary to use a vertical alignment material or different alignment control films. As a result, a film-forming process is simplified to reduce production costs and it is also possible to remedy a problem of an adverse influence or contamination on a principal alignment control film (rubbing portion).

Further, according to the sixth embodiment, the rubbing mask 70 may have an end section having a thickness of, e.g., 0.1 mm to minimize a difference in height caused by the rubbing mask 70, thus preventing uneven rubbing (rubbing irregularity) leading to alignment defects.

Further, according to the sixth embodiment, the rubbing mask 70 and the electrode substrate 1 are surely sucked and held on the substrate stage 90, whereby a deviation or peeling-off of the rubbing mask 70 from a prescribed position can be suppressed. In addition, the pressing part 72 of the rubbing mask 70 is caused to closely contact the surface of the electrode substrate 1 by the action of the magnetic force of the magnets 91, so that it is possible to prevent formation of a space or gap between the rubbing mask 70 and the alignment control film 10. As a result, an occurrence of alignment defects and abrasion of the rubbing cloth can be suppressed.

Incidentally, the effect of preventing the deviation or peeling-off of the rubbing mask 70 is not affected by a thickness or an opening area of the rubbing mask 70. Accordingly, it is possible to produce a large-sized liquid crystal display device free from alignment defects by using a rubbing mask 70 having a large opening area. In the sixth embodiment, the rubbing treatment may be performed with respect to plural regions of a single electrode substrate by using a rubbing mask provide with plural opening parts and then cutting the electrode substrate, whereby a plurality of electrode substrates were prepared to improve production efficiency.

In the sixth embodiment, although a part of the rubbing mask 70 is composed of a paramagnetic material, all the rubbing mask 70 may be composed of a paramagnetic material.

As described hereinabove, according to the present invention, it is possible to stably impart an alignment control power to only a desired region of an alignment control film because rubbing treatment is performed by a specific rubbing mask as described above. The specific rubbing mask is also effective in obviating a deterioration of a rubbing cloth caused by rubbing a portion at which the alignment control film is not formed.

Further, in the case of imparting a particular alignment control power to only a particular region of an alignment control film by performing rubbing treatment of a prescribed region of the alignment control film as described above with respect to the related art, it is not necessary to use a vertical alignment material or different alignment control films. As a result, a film-forming process is simplified to reduce production costs and it is also possible to remedy a problem of an adverse influence or contamination on a principal alignment control film (portion).

Further, according to the present invention, the rubbing mask and the electrode substrate are surely caused to closely contact or held on the substrate stage, whereby a deviation or peeling-off of the rubbing mask from a prescribed position can be suppressed during rubbing treatment. The rubbing mask is also caused to closely contact the electrode substrate by a holding (close-contact) means such as a suction passage (and a vacuum pump) or a magnet, thus preventing formation of a space or gap between the rubbing mask and the electrode substrate. As a result, it is possible to prevent an occurrence of alignment defects or abrasion of the rubbing cloth. Accordingly, by using a thin rubbing mask, it is possible to prevent rubbing irregularity (uneven rubbing) leading to alignment defects. In this instance, the thin rubbing mask may preferably have a thickness of at most 0.25 mm at an end section of an opening part of the rubbing mask.

Further, even in a case where a rubbing mask is composed of a flexible material and is caused to closely contact an electrode substrate by its flexibility, similarly as in the above cases, it is possible to prevent inclusion of dust into a gap between the rubbing mask and the electrode substrate, thus preventing attachment of dust onto the electrode substrate. Consequently, alignment defects and irregularity in cell thickness are suppressed.

Further, by using a rubbing mask with a large opening area, it is possible to realize a liquid crystal display device with a large display area free from alignment defects. Further, by providing a rubbing mask with plural opening parts, it is possible to perform rubbing treatment with respect to plural regions of the electrode substrate simultaneously. As a result, if the thus-treated electrode substrate is cut, it becomes possible to provide plural electrode substrates by a single rubbing treatment, thus enhancing production efficiency.

Further, by providing a rubbing mask with plural opening parts and disposing a holding (close-contact) means at an elongated strip portion defining the opening parts, it is possible to prevent deformation of the strip portion, an occurrence of alignment defects and abrasion of the rubbing cloth. In the case of designing a rubbing mask having the strip portion so as to be supplied with a residual tensile stress, the residual tensile stress ensures a stiffness of the strip portion to prevent flexure or deformation of the strip portion, thus suppressing an occurrence of alignment effects and abrasion of the rubbing cloth.

Further, in case where a rubbing mask is provided with a suction passage connected to suction means to constitute a holding (close-contact) means, deformation of the rubbing mask due to vacuum suction thereof by setting a thickness of a portion of the rubbing mask provided with the suction passage to be at least 0.175 mm, thus stably ensuring a holding (close-contact) state of the rubbing mask onto the electrode substrate. When rubbing treatment is performed by using such a rubbing mask, it is possible to prepare a liquid crystal display device providing a uniform contrast over the entire display region thereof.

A liquid crystal (display) device is prepared by oppositely disposing a pair of electrode substrates each provided with an alignment control film rubbing (aligning)-treated by means of the rubbing apparatus according to the present invention and by filling a liquid crystal into a gap between the electrode substrates. In this instance, the liquid crystal may include various liquid crystal materials, preferably a chiral smectic liquid crystal or a ferroelectric liquid crystal. In the case of using the chiral smectic or ferroelectric liquid crystal, the cell gap is set to be very thin (e.g., at most 2 $\mu$m). Accordingly, in this instance, the rubbing apparatus and rubbing method of the present invention may particularly preferably be applied because it is possible to rubbing-treat an electrode substrate provided with an alignment control film while attachment of dust or contaminant is minimized.

What is claimed is:

1. A rubbing treating apparatus, comprising: a stage for mounting thereon an electrode substrate provided with an alignment control film, a rubbing cloth for effecting rubbing treatment by rubbing it against the alignment control film, a rectangular frame-shaped masking sheet having a rectangular opening and a peripheral frame portion surrounding the opening, the masking sheet being mounted on the stage so as to cover a peripheral part of the electrode substrate, and a holding means for causing the masking sheet to selectively closely contact the stage at the peripheral frame portion while allowing the masking sheet to cover the peripheral part of the electrode substrate and expose a central part of the electrode substrate through the opening for rubbing at the time of the rubbing treatment;

wherein the stage is provided with at least one suction passage as the holding means directed to the masking sheet at a position where the stage abuts the masking sheet, and the masking sheet is caused to closely contact and is held on the stage by suction through at least one of said at least one suction passage so as to resist a shearing force acting between the masking sheet and the stage in a rubbing direction at the time of the rubbing treatment.

2. An apparatus according to claim 1, wherein the masking sheet is provided with at least one suction passage directed to the electrode substrate at a position where the masking sheet abuts the electrode substrate, and the masking sheet is caused to closely contact the electrode substrate by sucking air between the masking sheet and the electrode substrate through at least one of said at least one suction passage at the time of the rubbing treatment.

3. An apparatus according to claim 2 wherein at least one of said at least one suction passage of the masking sheet is directed to the surface of the alignment control film.

4. An apparatus according to claim 2, wherein the masking sheet comprises a laminated structure in which plural frame-shaped members are respectively provided with a through-hole and/or a groove portion, the respective through-holes and/or the respective groove portions communicating with each other.

5. An apparatus according to claim 1, wherein the stage is provided with at least one suction passage directed to the masking sheet at a position where the stage abuts the masking sheet;

the masking sheet is provided with at least one suction passage directed to the electrode substrate at a position where the masking sheet abuts the electrode substrate;

at least one of said at least one suction passage of the stage communicates with at least one of said at least one suction passage of the masking sheet; and the masking sheet is caused to closely contact and is held on the stage by suction through at least one of said at least one suction passage of the stage while being caused to closely contact the electrode substrate by sucking air between the masking sheet and the electrode substrate through the at least one suction passages of (i) the stage and (ii) the masking sheet at the time of the rubbing treatment.

6. An apparatus according to claim 1, wherein the stage is provided with at least one suction passage directed to the electrode substrate abutting the stage, and the electrode substrate is caused to closely contact and is held on the stage by suction through at least one of said at least one suction passage at the time of the rubbing treatment.

7. An apparatus according to claim 1, wherein the stage is provided with at least one suction passage leading to a gap between the side of the electrode substrate and the masking sheet, and the electrode substrate is caused to closely contact and is held on the stage by suction through at least one of said at least one suction passage at the time of the rubbing treatment.

8. An apparatus according to claim 1, wherein the masking sheet comprises plural frame-shaped members constituting a laminated structure.

9. An apparatus according to claim 1, wherein the masking sheet has plural opening parts allowing rubbing treatment of plural regions at the same time.

10. An apparatus according to claim 1, wherein the masking sheet comprises a flexible material and is caused to closely contact and is held on the electrode substrate due to its flexure.

11. A rubbing treating apparatus, comprising: a stage for mounting thereon an electrode substrate provided with an alignment control film, a rubbing cloth for effecting rubbing treatment by rubbing it against the alignment control film, a rectangular frame-shaped masking sheet having a rectangular opening and a peripheral frame portion surrounding the opening, the masking sheet being mounted on the stage so as to cover a peripheral part of the electrode substrate, and a close-contact means for causing the masking sheet to selectively closely contact the electrode substrate at the peripheral frame portion while allowing the masking sheet to cover the peripheral part of the electrode substrate and expose a central part of the electrode substrate through the opening for rubbing at the time of the rubbing treatment;

wherein the masking sheet is provided with at least one suction passage as the close-contact means directed to the electrode substrate at a position where the masking sheet abuts the electrode substrate, and the masking sheet is caused to closely contact the electrode substrate by sucking air between the masking sheet and the electrode substrate through at least one of said at least one suction passage so as to resist a shearing force acting between the masking sheet and the electrode substrate in a rubbing direction at the time of the rubbing treatment.

12. An apparatus according to claim 11, wherein at least one of said at least one suction passage of the masking sheet is directed to the surface of the alignment control film.

13. An apparatus according to claim 11, wherein the stage is provided with at least one suction passage directed to the masking sheet at a position where the stage abuts the masking sheet;

the at least one suction passage of the stage communicates with the at least one suction passage of the masking sheet; and the masking sheet is caused to closely contact and is held on the stage by suction through at least one of said at least one suction passage of the stage while being caused to closely contact the electrode substrate by sucking air between the masking sheet and the electrode substrate through the at least one suction passages of (i) the stage and (ii) the masking sheet at the time of the rubbing treatment.

14. An apparatus according to claim 11, wherein the stage is provided with at least one suction passage directed to the electrode substrate abutting the stage, and the electrode substrate is caused to closely contact and is held on the stage by suction through at least one of said at least one suction passage at the time of the rubbing treatment.

15. An apparatus according to claim 11, wherein the stage is provided with at least one suction passage leading to a gap between the side of the electrode substrate and the masking sheet, and the electrode substrate is caused to closely contact and is held on the stage by suction through at least one of said at least one suction passage at the time of the rubbing treatment.

16. An apparatus according to claim 11, wherein the masking sheet has at least one opening part and an end section which has a thickness of at most 0.25 mm and contacts said at least one opening part.

17. An apparatus according to claim 11, wherein the masking sheet is provided with plural opening parts and a strip portion defining the plural opening parts, and the strip portion is provided with the close-contact means by which the strip portion is caused to closely contact the electrode substrate at the time of the rubbing treatment.

18. An apparatus according to claim 11, wherein the masking sheet comprises a first part abutting the stage, a second part connected with the first part and formed along a peripheral portion of a region in which the electrode substrate is mounted, and a third part connected with the second part and disposed so as to abut the surface of the alignment control film at a peripheral portion of the electrode substrate when the electrode substrate is mounted.

19. An apparatus according to claim 18, wherein the first part is provided with a through-hole and the second part is provided with a passage or a groove portion; the through-hole and the passage or groove portion constitute a suction passage; and the masking sheet is caused to closely contact the electrode substrate by sucking air between the masking sheet and the electrode substrate through the suction passage at the time of the treatment.

20. An apparatus according to claim 19, wherein the stage is provided with at least one suction passage directed to and communicating with at least one of said at least one suction passage of the masking sheet at a position where the stage abuts the masking sheet, and the masking sheet is caused to closely contact the stage and the electrode substrate through the at least one suction passages of (i) the stage and (ii) the masking sheet at the time of the rubbing treatment.

21. An apparatus according to claim 11, wherein the close-contact means comprises a magnet disposed within the stage and the masking sheet comprises at least a part composed of a paramagnetic material.

22. A rubbing treating method, comprising:

covering at least a part of an alignment control film, provided to an electrode substrate mounted on a stage, with a rectangular frame-shaped masking sheet having a rectangular opening and a peripheral frame portion surrounding the opening, the masking sheet being mounted on the stage so as to cover a peripheral part of the electrode substrate, and selectively rubbing the alignment control film, wherein the masking sheet is caused to selectively closely contact the stage at the peripheral frame portion while covering the peripheral part of the electrode substrate and exposing a central part of the electrode substrate through the opening for rubbing at the time of the rubbing treatment;

wherein the stage is provided with at least one suction passage as the holding means directed to the masking sheet at a position where the stage abuts the masking sheet, and the masking sheet is caused to closely contact and is held on the stage by suction through at least one of said at least one suction passage so as to resist a shearing force acting between the masking sheet and the stage in a rubbing direction at the time of the rubbing treatment.

23. A rubbing treating method, comprising:

covering at least a part of an alignment control film, provided to an electrode substrate mounted on a stage, with a rectangular frame-shaped masking sheet having a rectangular opening and a peripheral frame portion surrounding the opening, the masking sheet being mounted on the stage so as to cover a peripheral part of the electrode substrate, and selectively rubbing the alignment control film, wherein the masking sheet is caused to selectively closely contact the stage at the peripheral frame portion while covering the peripheral part of the electrode substrate and exposing a central part of the electrode substrate through the opening for rubbing at the time of the rubbing treatment by exhausting air between the peripheral frame portion of the masking sheet and the peripheral part of the electrode substrate;

wherein the masking sheet is provided with at least one suction passage as the close-contact means directed to the electrode substrate at a position where the masking sheet abuts the electrode substrate, and the masking sheet is caused to closely contact the electrode substrate by sucking air between the masking sheet and the electrode substrate through at least one of said at least one suction passage so as to resist a shearing force acting between the masking sheet and the electrode substrate in a rubbing direction at the time of the rubbing treatment.

* * * * *

UNITED STATES PATENT AND TRADEMARK OFFICE
CERTIFICATE OF CORRECTION

PATENT NO. : 5,844,650

DATED : December 1, 1998

INVENTORS : MASAMICHI SAITO, ET AL.

It is certified that error appears in the above-identified patent and that said Letters Patent is hereby corrected as shown below:

[54] TITLE

"RUBBING TREATING" should read --RUBBING-TREATING-- (both occurrences)

COLUMN 1

Lines 2-3, "RUBBING TREATING" should read --RUBBING-TREATING--.
Line 5, "FILE" should read --FIELD--.

COLUMN 4

Line 54, "held" should read --be held--.
Line 60, "held" should read --be held--.

COLUMN 5

Line 7, "held" should read --be held--.
Line 50, "held" should read --be held--.
Line 57, "held" should read --be held--.

UNITED STATES PATENT AND TRADEMARK OFFICE

CERTIFICATE OF CORRECTION

PATENT NO. : 5,844,650

DATED : December 1, 1998

INVENTORS : MASAMICHI SAITO, ET AL.

It is certified that error appears in the above-identified patent and that said Letters Patent is hereby corrected as shown below:

COLUMN 6

Line 5, "be comprise" " should read --compromise--.

COLUMN 11

Line 60, "communicate" should read --communicates--.

COLUMN 12

Line 6, "include" should read --includes--.

UNITED STATES PATENT AND TRADEMARK OFFICE

CERTIFICATE OF CORRECTION

PATENT NO. : 5,844,650

DATED : December 1, 1998

INVENTORS : MASAMICHI SAITO, ET AL.

It is certified that error appears in the above-identified patent and that said Letters Patent is hereby corrected as shown below:

COLUMN 16

Line 50, "an" should be deleted.

COLUMN 19

Line 8, "held" should read --be held--.

COLUMN 20

Line 45,"claim 2" should read --claim 2,--.

Signed and Sealed this

Seventeenth Day of August, 1999

Attest:

Q. TODD DICKINSON

*Attesting Officer*

*Acting Commissioner of Patents and Trademarks*